Jan. 9, 1962 P. M. YOUNG 3,016,418

RECORD MEMORY DEVICE

Filed Aug. 22, 1960 18 Sheets-Sheet 1

FIG. I

READER-SENDER

INVENTOR

Paul M. Young

BY Sughrue, Rothwell, Mion & Zinn

ATTORNEYS

REPEAT UNIT - H

Jan. 9, 1962 P. M. YOUNG 3,016,418
RECORD MEMORY DEVICE
Filed Aug. 22, 1960 18 Sheets-Sheet 4
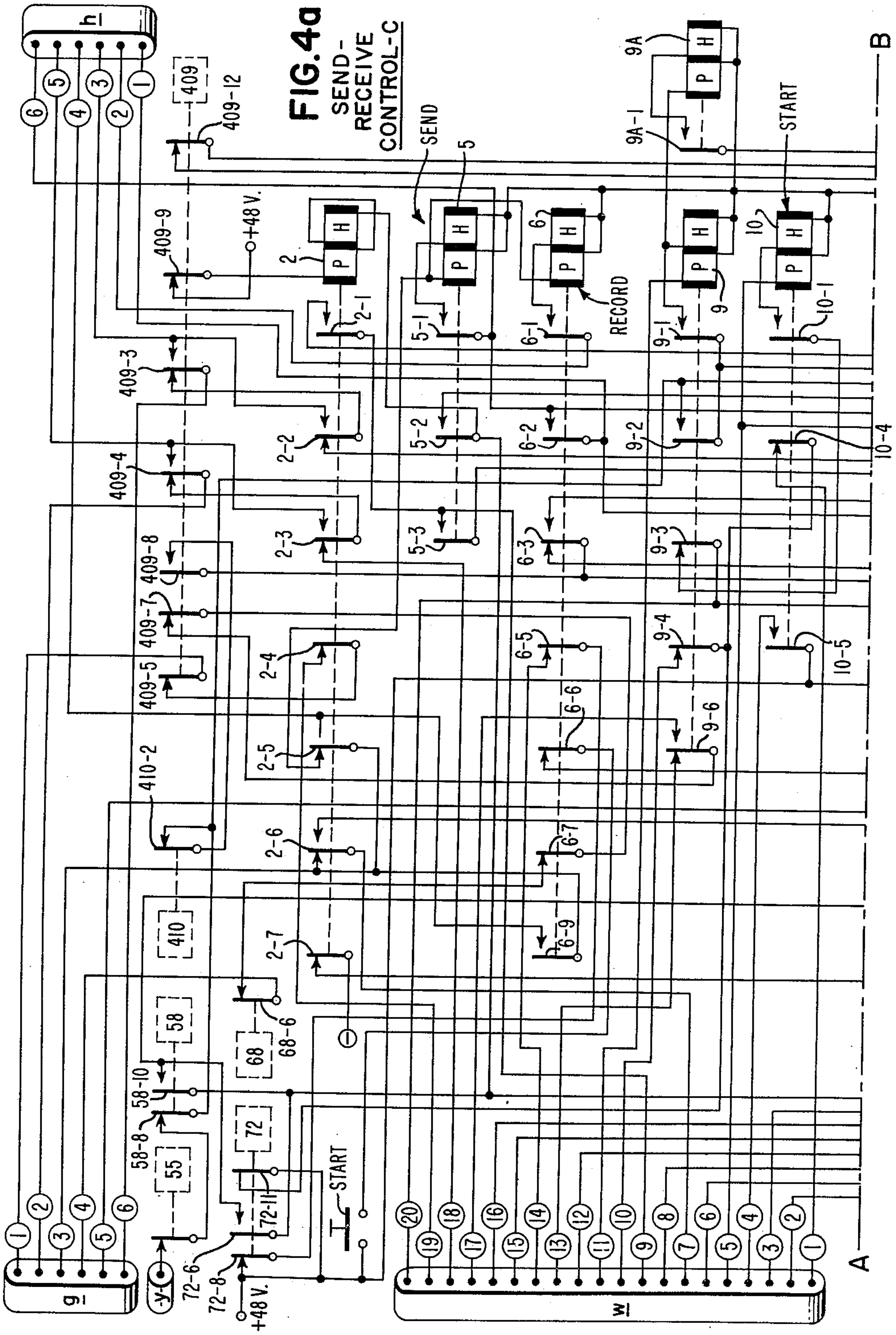
FIG. 4a SEND-RECEIVE CONTROL-C Jan. 9, 1962 P. M. YOUNG 3,016,418

RECORD MEMORY DEVICE

Filed Aug. 22, 1960 18 Sheets-Sheet 5

Jan. 9, 1962 P. M. YOUNG 3,016,418

RECORD MEMORY DEVICE

Filed Aug. 22, 1960

18 Sheets-Sheet 6

READER CONTROL-D

Jan. 9, 1962 P. M. YOUNG 3,016,418

RECORD MEMORY DEVICE

Filed Aug. 22, 1960 18 Sheets-Sheet 7

Jan. 9, 1962 P. M. YOUNG 3,016,418

RECORD MEMORY DEVICE

Filed Aug. 22, 1960 18 Sheets-Sheet 11

Jan. 9, 1962

P. M. YOUNG 3,016,418

RECORD MEMORY DEVICE

Filed Aug. 22, 1960

18 Sheets-Sheet 14

Jan. 9, 1962 P. M. YOUNG 3,016,418

RECORD MEMORY DEVICE

Filed Aug. 22, 1960

18 Sheets-Sheet 15

Jan. 9, 1962 P. M. YOUNG 3,016,418

RECORD MEMORY DEVICE

Filed Aug. 22, 1960 18 Sheets-Sheet 16

Jan. 9, 1962

P. M. YOUNG 3,016,418

RECORD MEMORY DEVICE

Filed Aug. 22, 1960

18 Sheets-Sheet 18

United States Patent Office 3,016,418
Patented Jan. 9, 1962

3,016,418
RECORD MEMORY DEVICE

Paul M. Young, Pleasant Valley, N.Y., assignor to International Business Machines Corporation, New York, N.Y., a corporation of New York Filed Aug. 22, 1960, Ser. No. 51,000
12 Claims. (Cl. 178—17)

This invention relates to data transmitting systems and, more particularly, to a system for locating a particular information record in a paper tape when a multiplicity of records repose between error deletion notches. The invention may be used in conjunction with error correction for a paper tape transmission system such as is disclosed and claimed in U.S. application Serial Number 665,532, filed June 13, 1957, hereinafter referred to as Application A, which is assigned to the assignee of the instant application.

As noted in the above identified Application A, it is essential in the duplication of recorded data at remote locations that errors introduced by transmission be eliminated and that the duplicate record be an accurate reproduction of the original. Heretofore, the checking of a duplicated record after transmission has required the attendance of an operator at the receiving point to call for a re-transmission of a record when an error is detected. The system of Application A discloses a duplicating system wherein each reproduced record is checked for accuracy immediately after transmission and, if necessary, it is transmitted one or more times before the next record is sent, in an effort to obtain a correctly reproduced record at the receiving station. The objectives of the system disclosed in Application A are attained by reading information recorded in parallel on a paper tape, column by column, and transmitting the bits comprising each character in sequence in a unit time from a reader-sender to a punch-receiver, applying the received message signal to a paper tape punch to reproduce the original tape, meanwhile accumulating a number representative of the total of information bits punched in the reproduced tape and comparing it with the total of bits in the original tape. If the totals agree, a check signal is sent from the punch-receiver to the reader-sender, and the reader proceeds to the next record. If, however, the totals are not identical, indicating an error in the reproduced message, the punch-receiver deletes the incorrect portion of the tape and the reader-sender re-transmits the record.

In paper tape nomenclature, a block of information is defined as the data contained in a tape between any two successive error deletion notches which are formed in the tape. Each block may consist of one or more records. A record is defined as a section of tape comprised of a beginning of record code, the message data, and the end of record code group. In the system proposed in Application A, a block is comprised of only one record. When an error is detected by the punch-receiver, both the transmitting tape reader and the receiving tape punch will reverse feed until the error notch designating the end of the last correct record is reached in each tape. The punch will then move forward and delete all the error section of its tape and be in a position to receive the re-transmitted record. The reader transmitter, upon detecting the error notch will stop, since this is also the beginning of the record which was incorrectly reproduced. It will thereafter wait a second signal from the punch indicating a re-transmission is to begin.

This invention provides structure to expand the correction system of Application A so that more than one record may exist in a block. Such would be the case when the tape is generated from a multilined punched data card on a "card to tape" machine or on a Cardatype (IBM trademark) which produces checkable type. During such generation, an error deletion notch is placed into the tape only when the card is first being read, so that no such error deletion notches are to be found between the records (lines) which are on the same card.

It is therefore an object of the present invention to provide means for locating a particular record in a paper tape when a multiplicity of records repose between error deletion notches.

It is a further object of the present invention to provide means for preventing the duplication of data when using a transmitting tape having multiple records between error indicia thereon.

It is another object of the present invention to provide means for counting the number of records transmitted correctly from a block, and then during an error detection cycle, counting the number of records read from the beginning of the block so as to arrive at the beginning of the incorrect record without transmitting the previously correctly reproduced records within the block.

It is yet another object of the present invention to provide a reader transmitter which utilizes a medium for storing a block of information records, and which further includes first means for reading said information records from said medium one at a time and second means for transmitting each said record as it is read so as to define a first mode of operation for said reader transmitter, and third means operative after one of said records has been transmitted for causing said first means to read said records from the beginning of said block while preventing said second means from transmitting so as to define a second mode of operation for said reader transmitter.

Other objects of the present invention will be pointed out in the following description when taken with the drawings, in which.

Figures 3, 6:
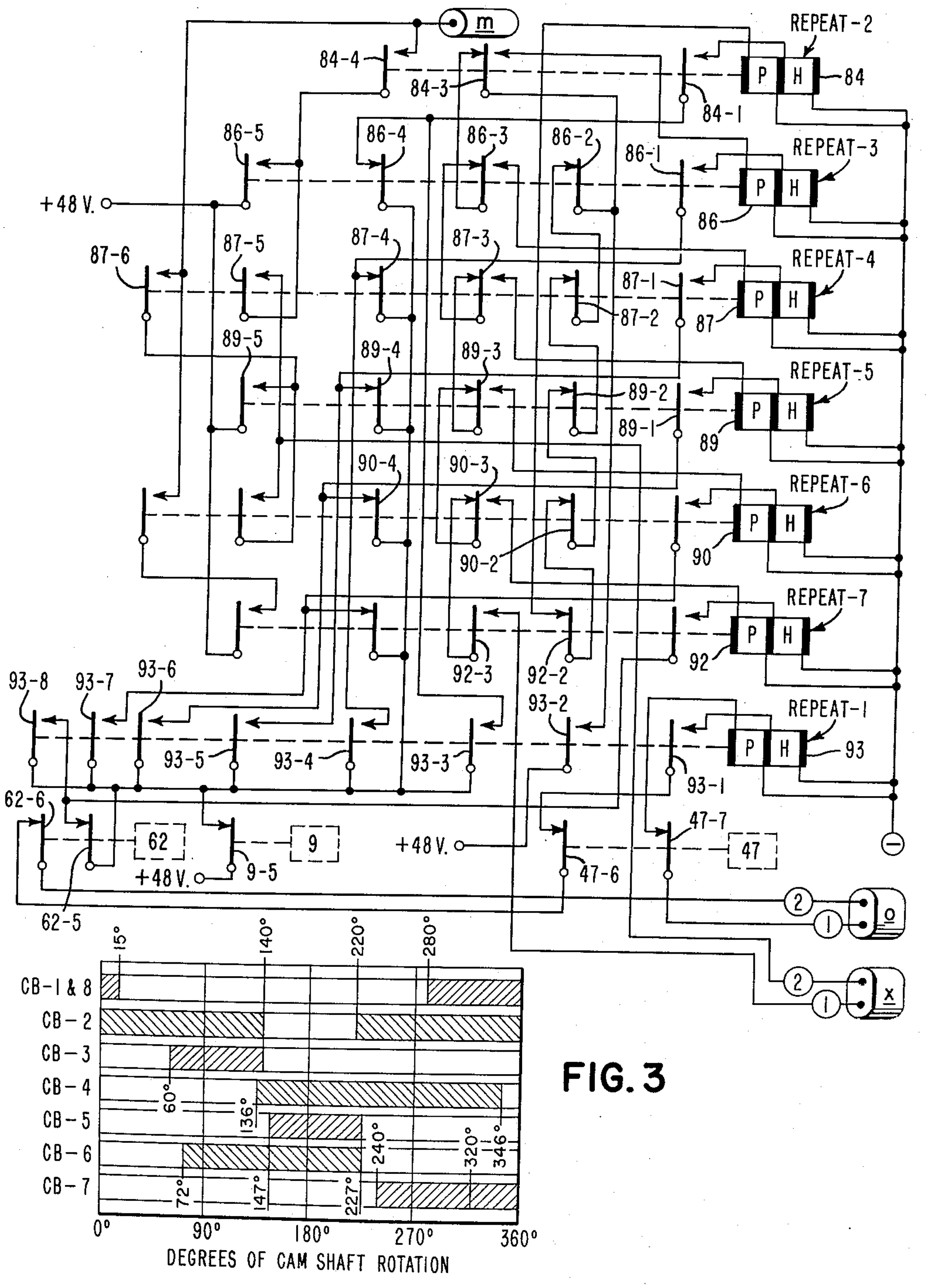
FIGURE 3 is a chart illustrating the sequence of actuation of a series of circuit breakers of a reader-timing unit.
Figure 4B:
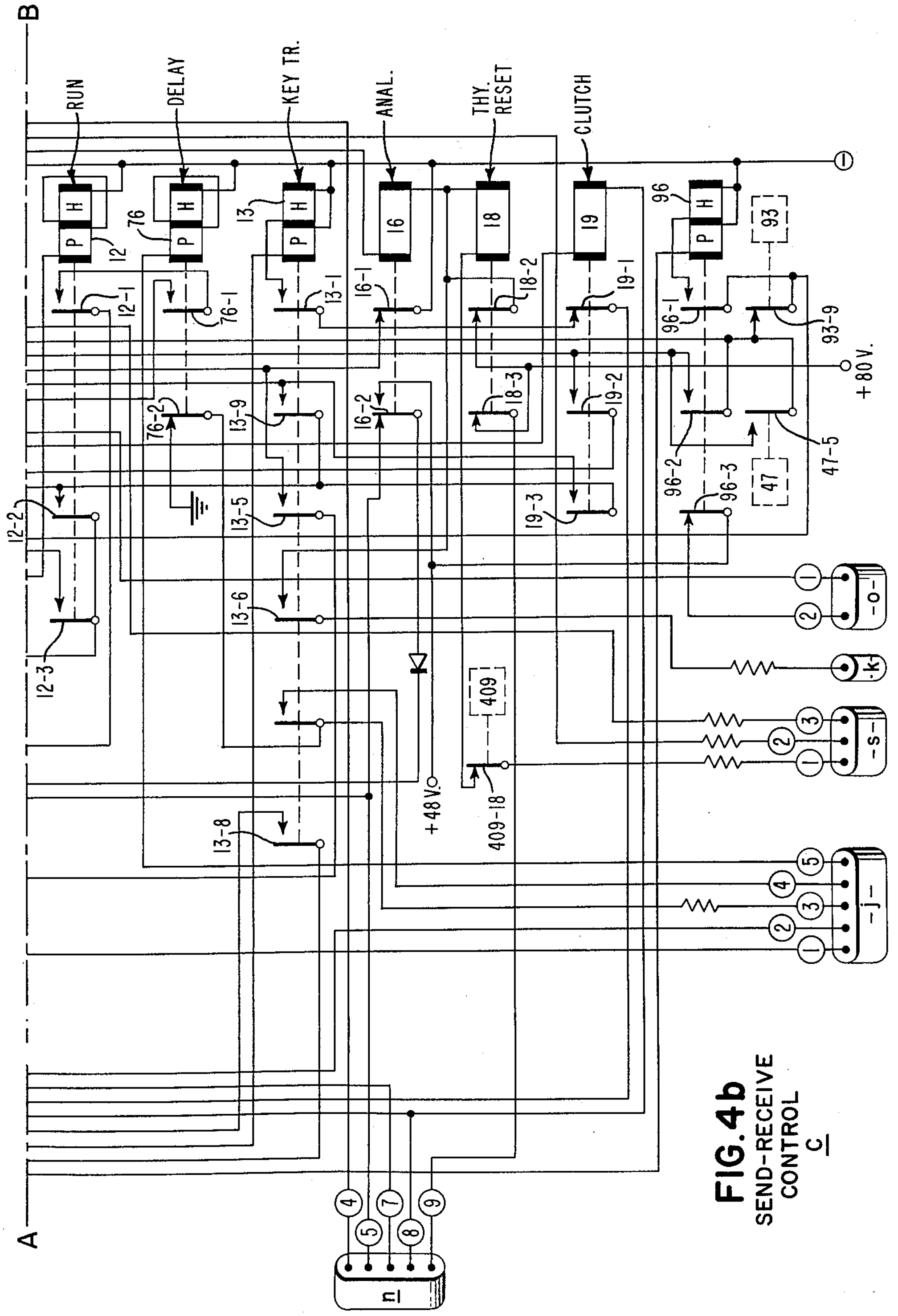
Figure 5:
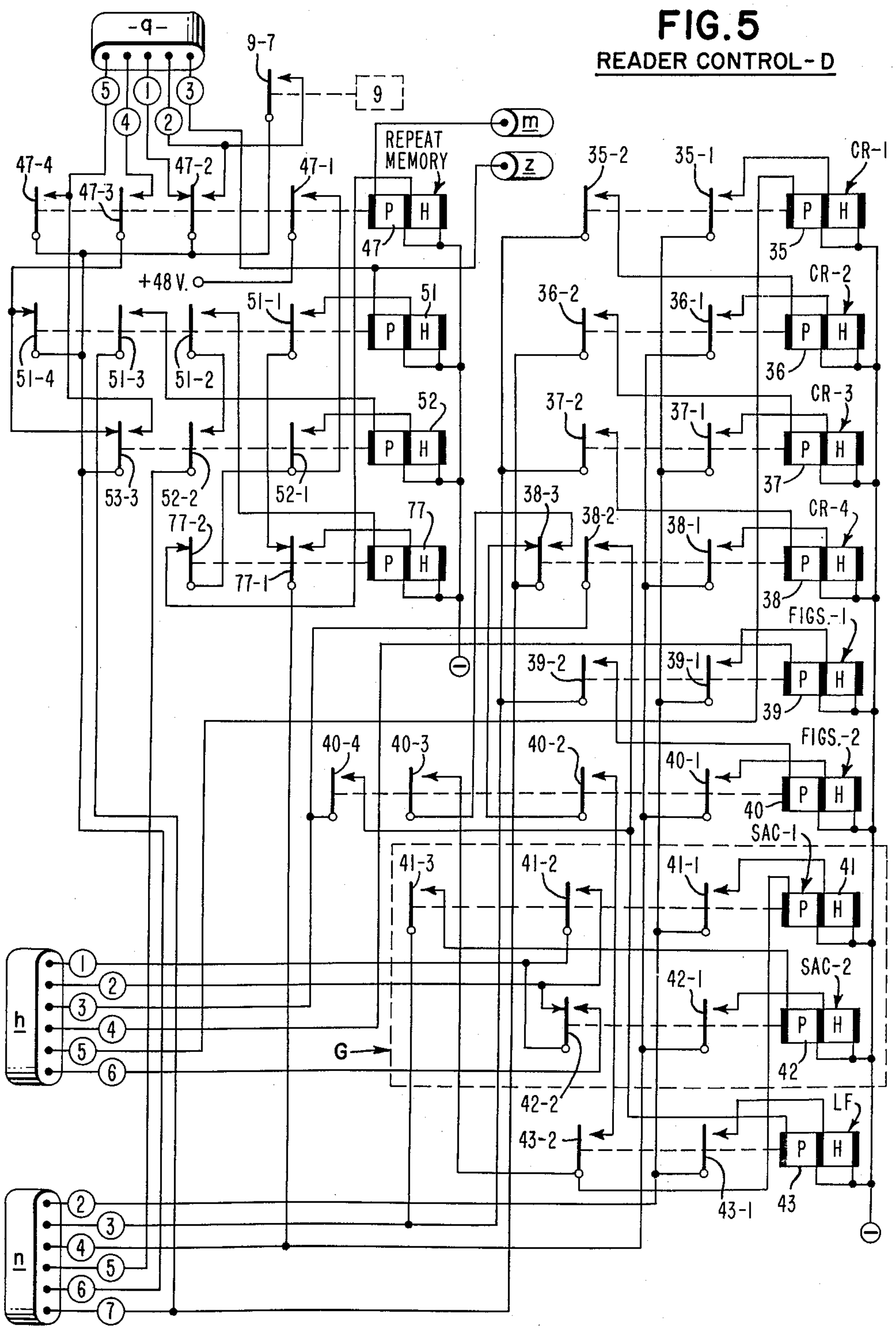
Figure 7:
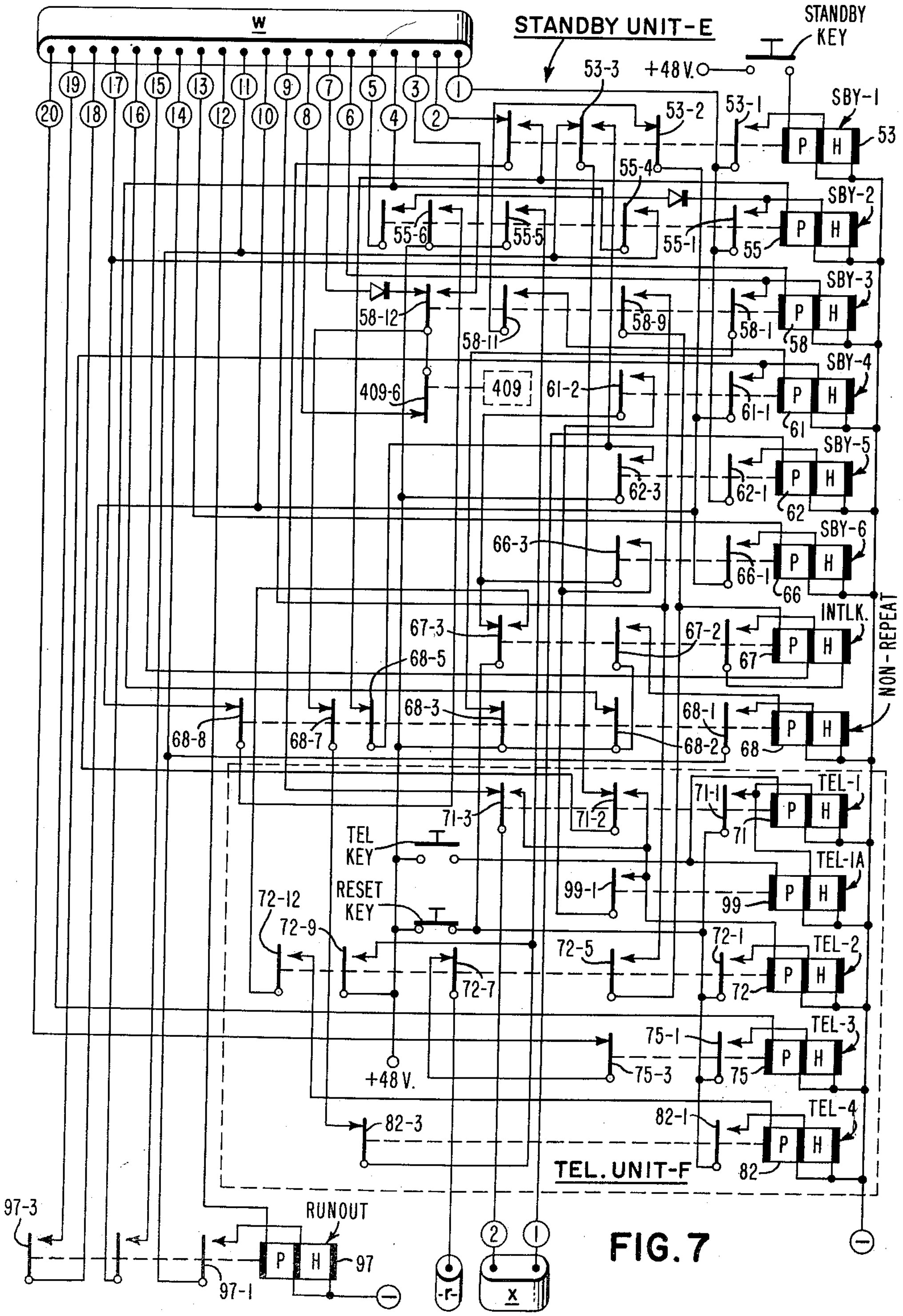
Figure 8A:
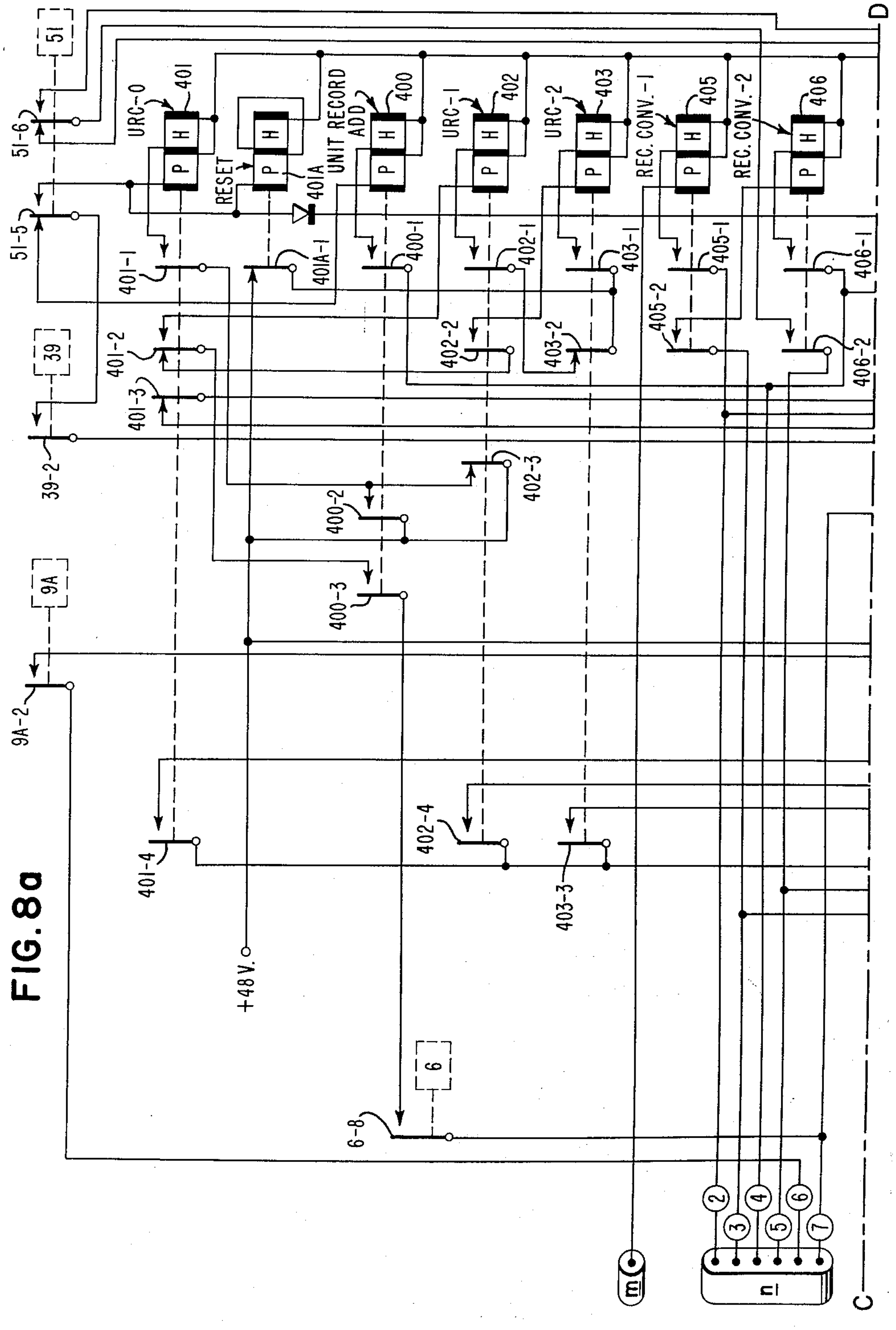
Figure 8B:
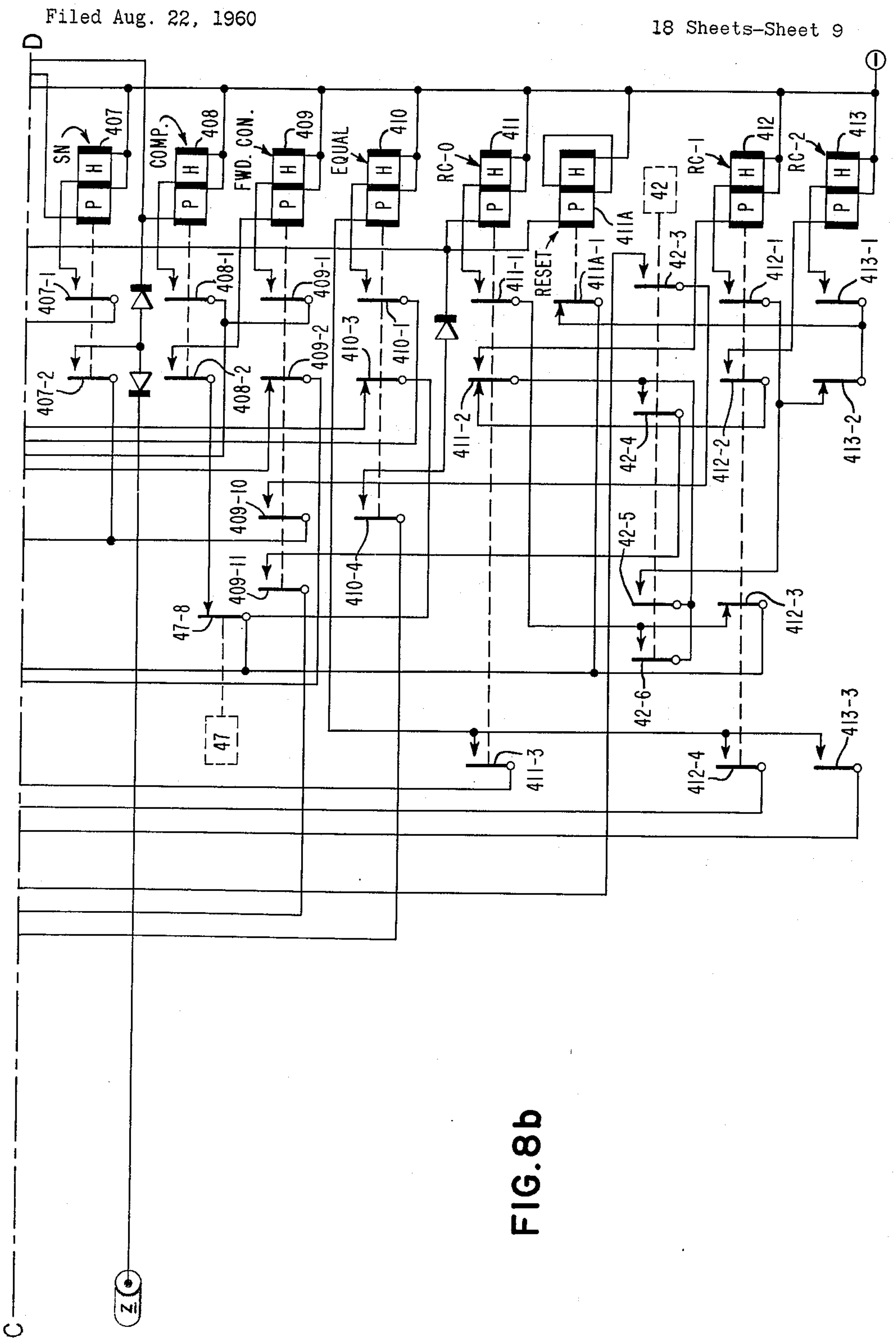
Figures 9, 10A, 10B, 11, 12A, 12B:
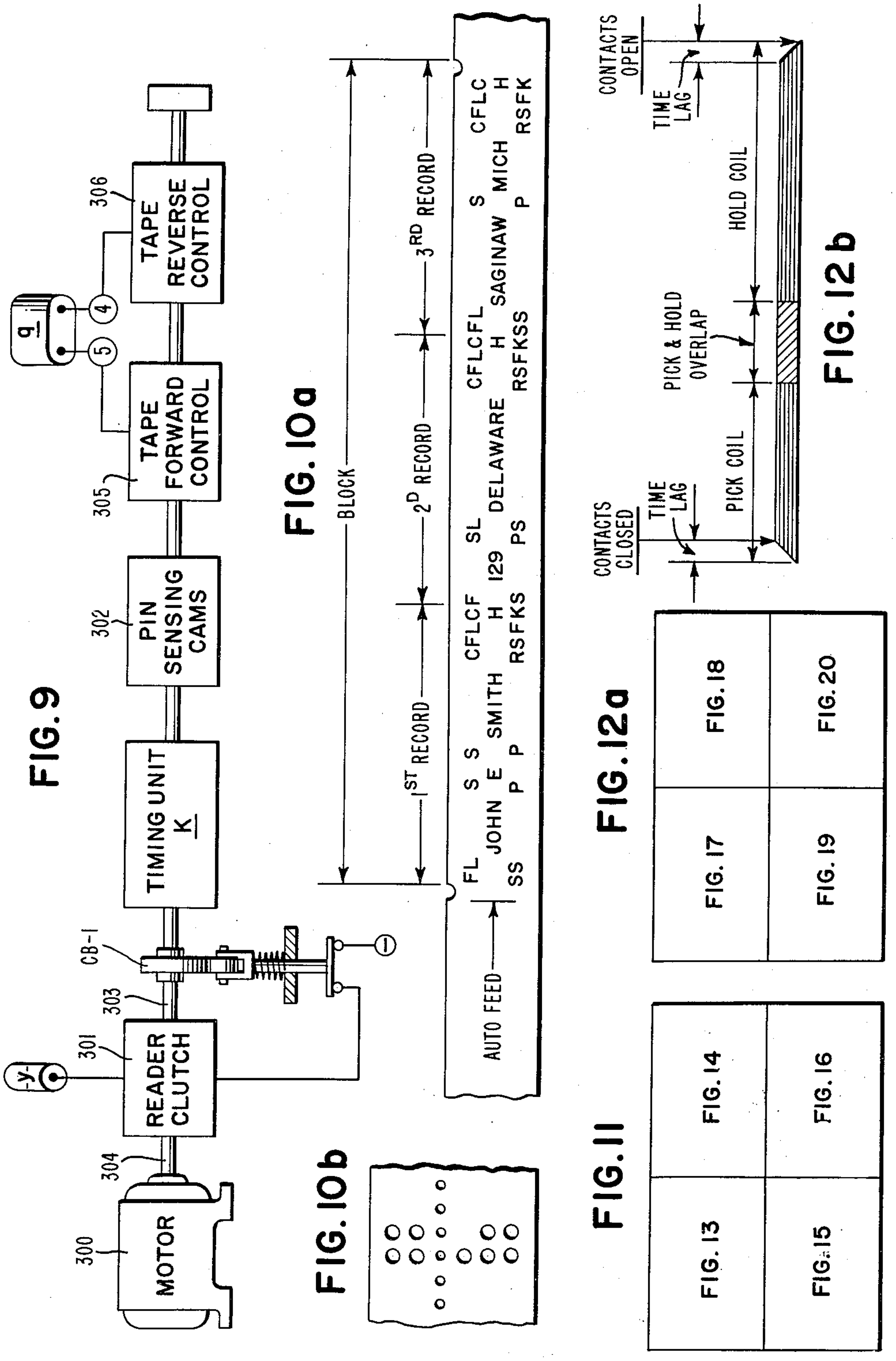
Figure 13:
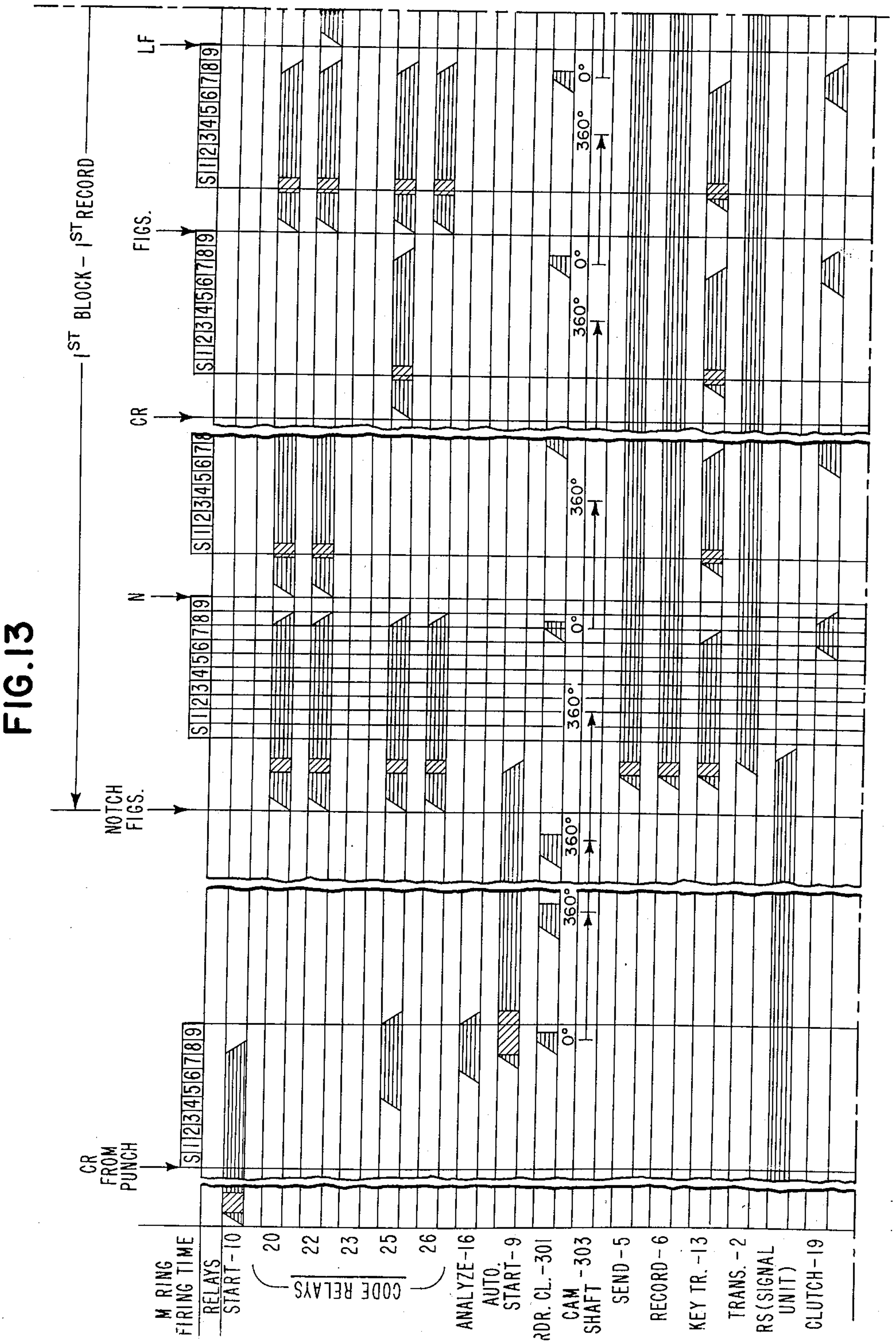
Figure 14:
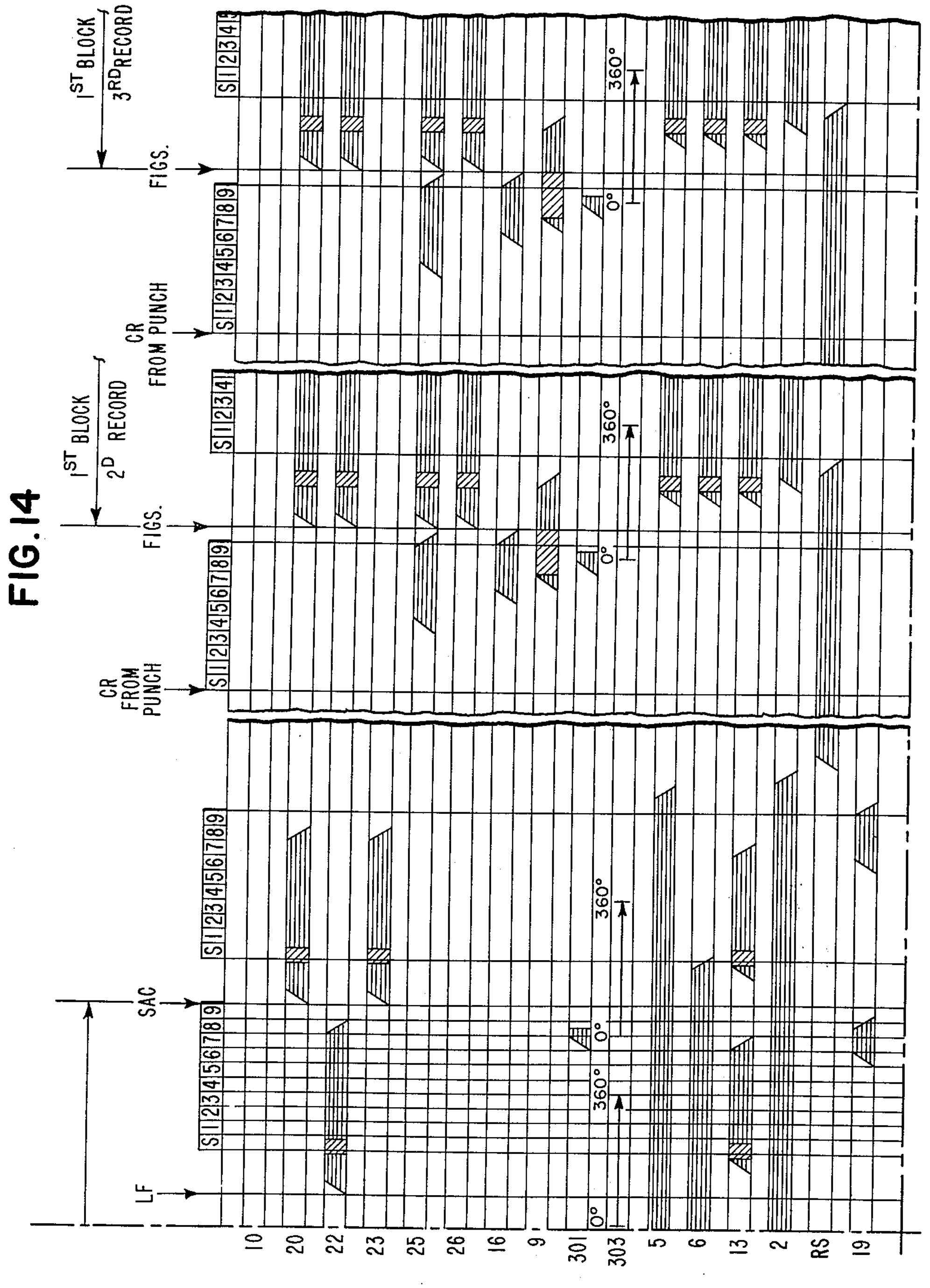
Figure 15:
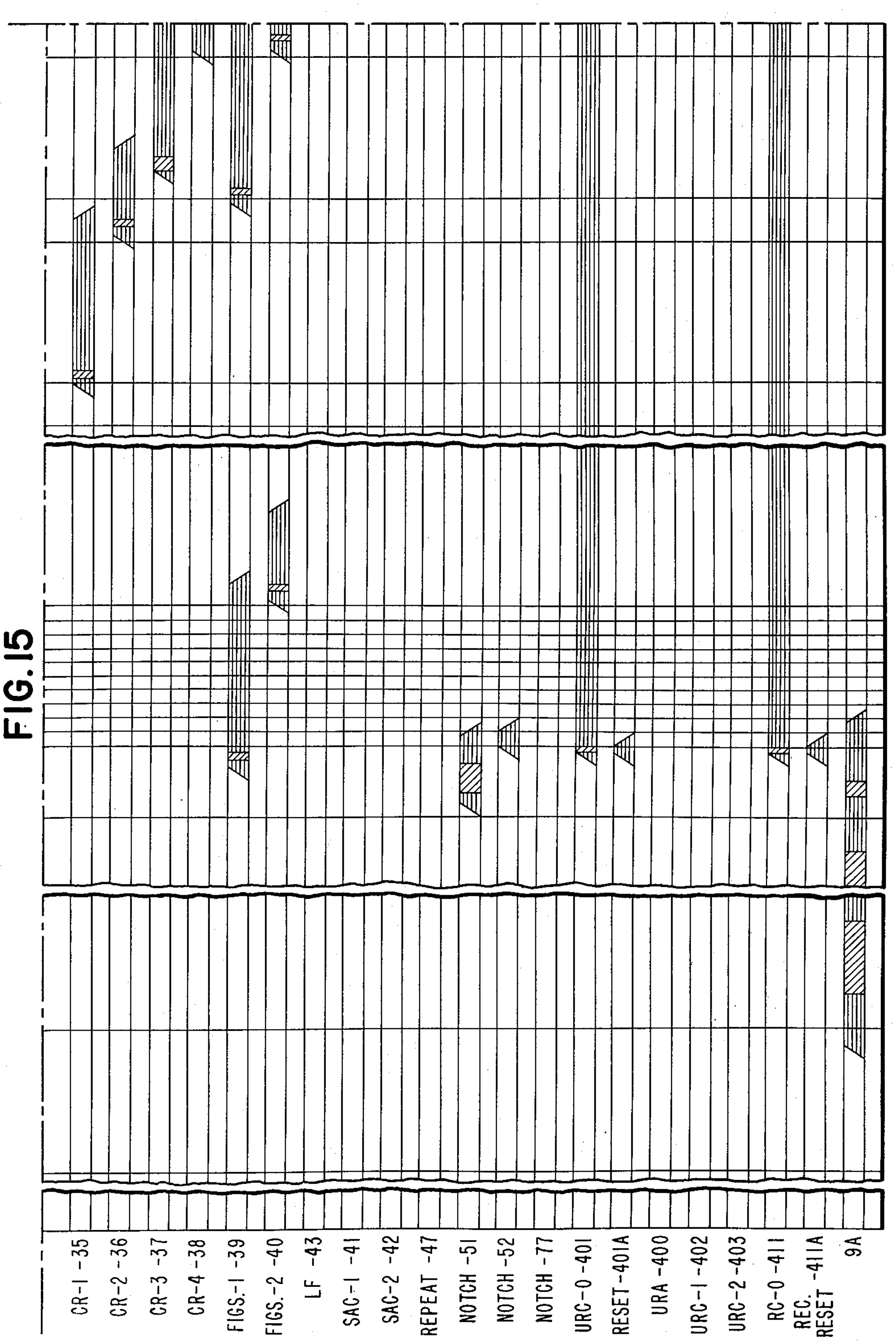
Figure 16:
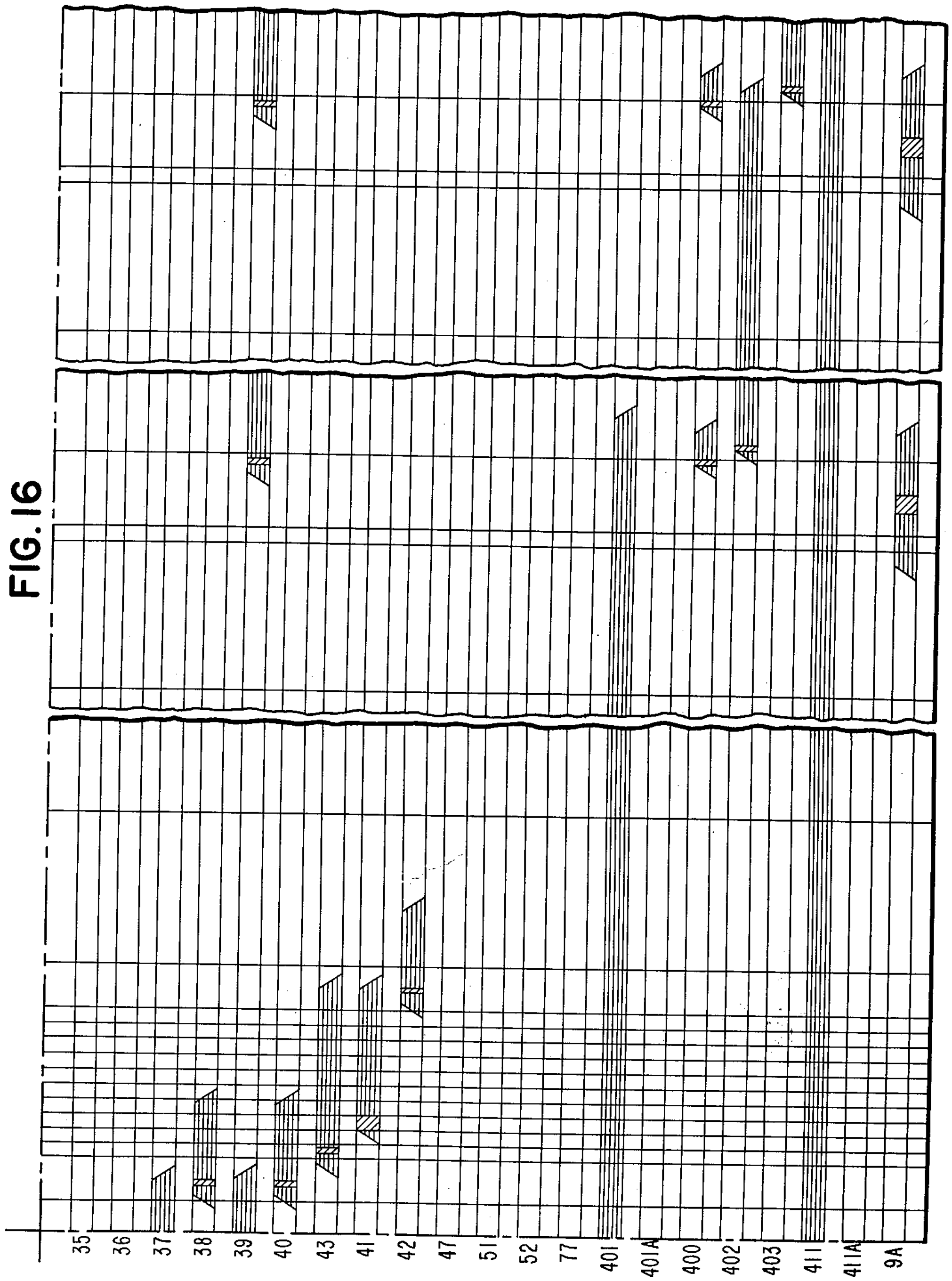

FIGURES 4*a* and 4*b* together form a schematic circuit diagram of the send-receive control unit;

FIGURE 5 is a schematic diagram of the reader-control unit including an accuracy check detection circuit;

FIGURE 6 is a schematic diagram of a network for controlling the number of re-transmissions of a record;

FIGURE 7 is a schematic circuit diagram of circuits for placing the reader-sender in a standby condition;

FIGURES 8*a* and 8*b* together form a schematic circuit diagram of circuits for locating the beginning of a particular record in a multiple record block according to the invention;

FIGURE 9 is a block diagram illustrating the tape reader used in the present invention;

FIGURES 10*a* and 10*b* show the construction of the tape used at the reader-sender;

FIGURE 11 illustrates how FIGURES 13 through 16 are to be associated with each other;

FIGURE 12*a* illustrates how FIGURES 17 through 20 are to be associated with each other;

FIGURE 12*b* is the legend for FIGURES 13 through 20; and

FIGURES 13 through 20 are sequence diagrams showing the picking and dropping of various relays within the reader-transmitter.

Figure 1:
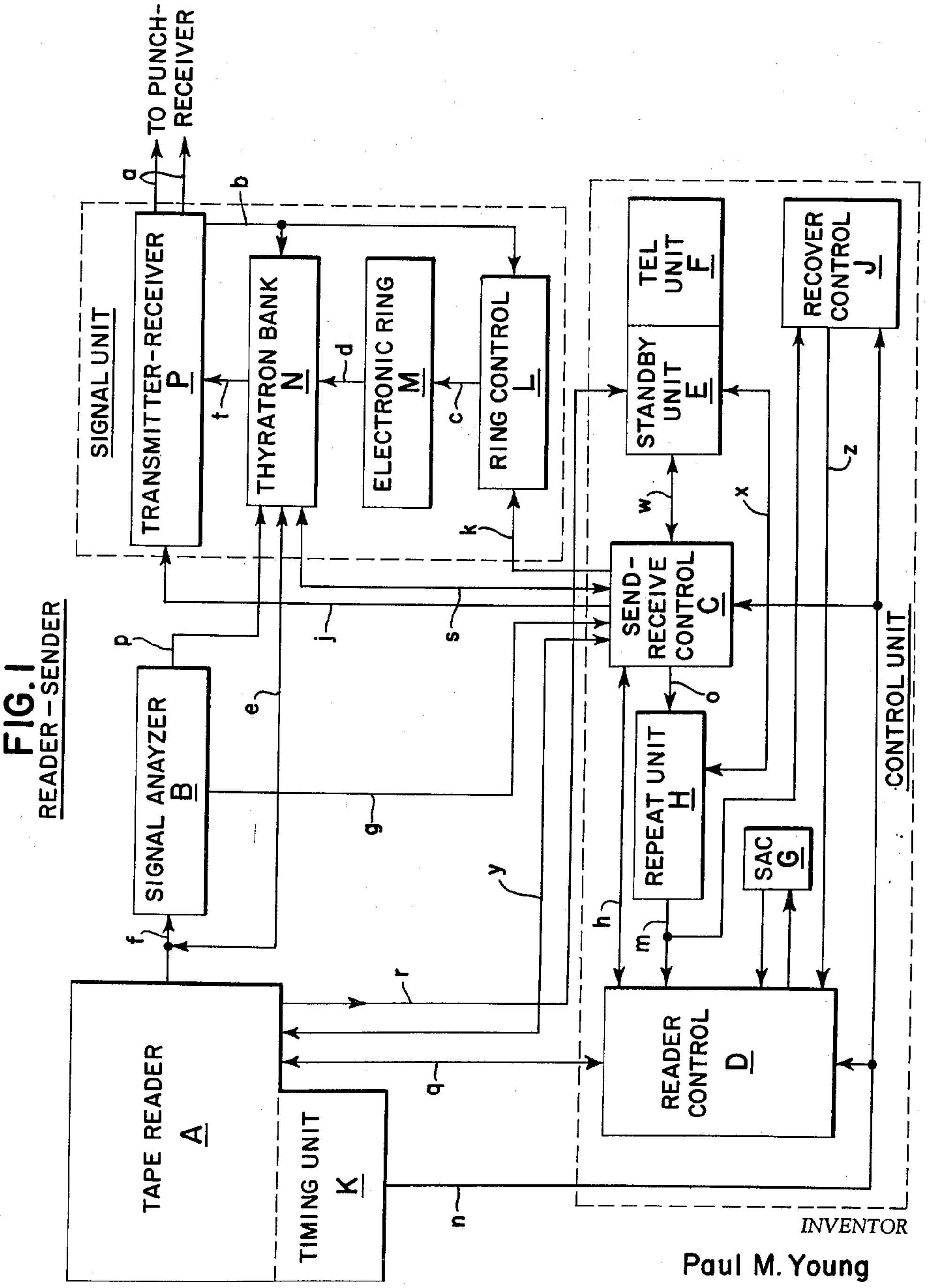
FIGURE 1 is a block diagram illustrating schematically a typical reader-sender arranged according to the invention.

Referring first to reader-sender block diagram shown in FIGURE 1, coded paper tape to be duplicated at a distant location is positioned in a tape reader A of the reader-sender. The specific arrangement of the various units of the apparatus mentioned in the general description of the system is to be described in detail later. Power is applied to the reader-sender and the punch-receiver (not shown), and, after a suitable warm-up delay period, starting circuits are closed in a send-receive control C. Depression of starting switches at the punch causes a series of pulses comprising a check code to be transmitted over signal lines *a* and to a transmitter-receiver P of the reader-sender signal unit.

Inasmuch as the tape transmission system is arranged according to the invention so that control of the system is usually retained at the punch-receiver, switching to the reader-sender only for re-transmission of a message incorrectly recorded, the transmitter-receiver P of the reader-sender unit is normally in condition to receive signals from the punch-receiver.

Receipt of the check code initiates operation of the reader-sender, and the first pulse of the code, being a synchronizing pulse, is applied through a line *b* to a ring control L which in turn signals an electronic ring M through a line *c* to start its operation. The electronic ring M conditions the first grids of a series of thyratrons in a thyratron bank N in a timed sequence through a cable *d* so that signals applied to the second grids will cause them to conduct. Subsequent pulses received from the lines *a* are applied to the second grids of the thyratrons in the bank N in timed relation to the operation of the ring M, corresponding signals from the thyratron plates being applied to a signal analyzer B through cables *e* and *f*. Actuation of appropriate relays within the signal analyzer B actuates the send-receive control C through a cable *g*, conditioning a reader control D through a cable *h*. A signal from the reader control D is in turn applied to the tape reader A by way of a line *q* to start moving a tape record across perforation sensing contacts within the reader.

Figure 2:
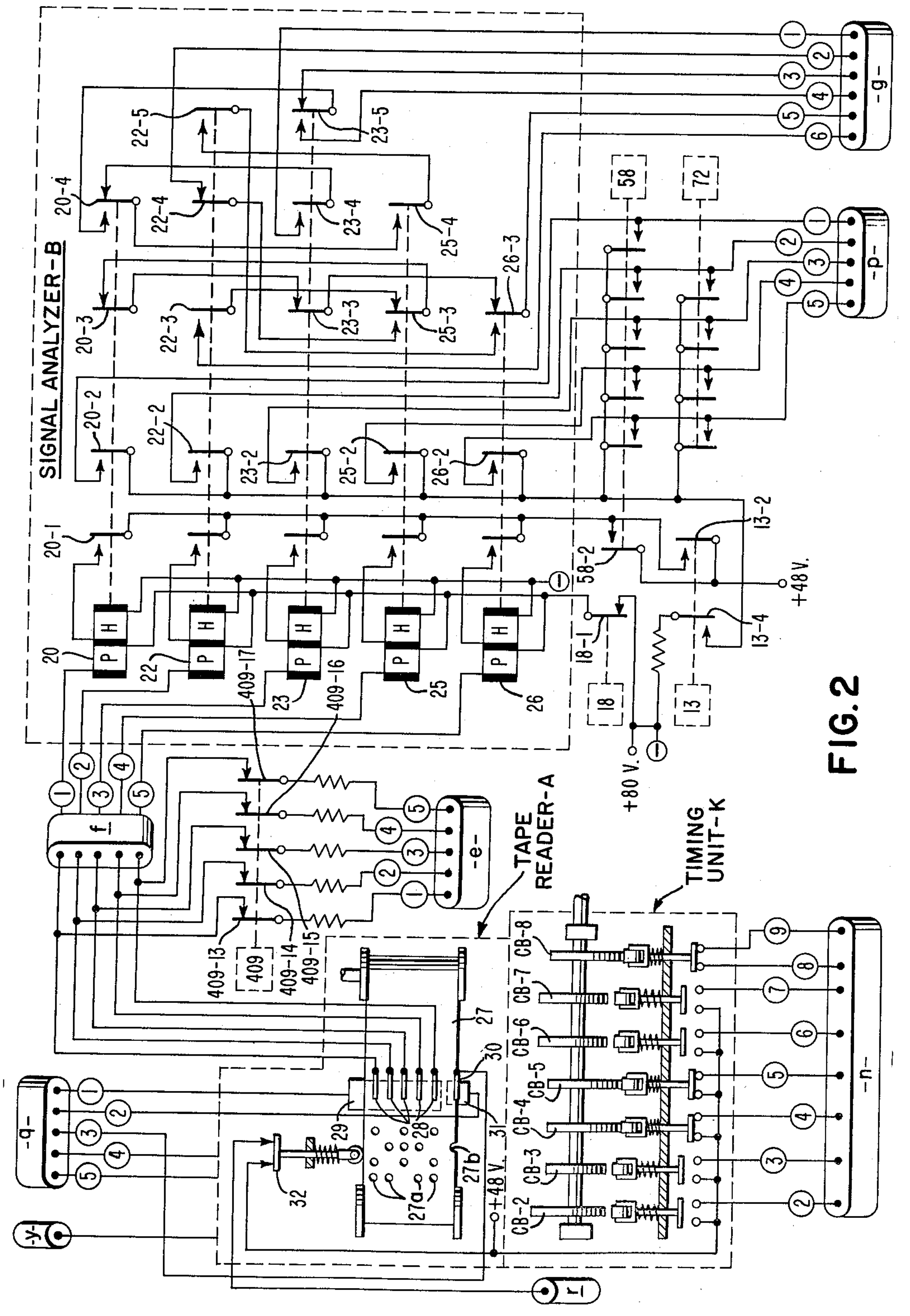
FIGURE 2 is a schematic circuit diagram showing apparatus for reading information recorded on paper tape and a code analyzing network.

As illustrated in FIGURES 2 and 10, a paper tape 27 adapted for use with this embodiment of the invention is of the type described in copending U.S. application Serial No. 553,001, filed December 14, 1955, which has five channels and is adapted to be perforated with successive transverse columns of holes **27*a* each column repsresenting a coded information character. Inasmuch as successive blocks of records must be distinguished independently of the information recorded in the five channels during the error reletion operation to be discussed in detail later, an edge notch 27*b*** is provided at the start of each block. For purposes of the present description, each block contains three records. When this notch is followed by a certain code character, it marks the beginning of the first record in the block, the end of the record being indicated by a series of selected code characters occurring in the proper sequence. Only the data transmitted "in record," that is, from the beginning-of-record code character to the end-of-record code group, inclusive, along with a code number indicating the total of information bits in the record, is duplicated at the punch-receiver.

It will be noted that the number of different character codes available in a five channel system is insuffcent to represent all the letters of the alphabet and ten digits along with the required operational codes. Therefore, the codes representing the digits are identical with certain of the letters codes but are preceded by a "letters" (LTRS) or "figures" (FIGS) code to distinguish between the two assignments, only one such distinguishing code being required when shifting to a series of successive letters or figures. In addition, certain of the codes having assigned functions when transmitted in record assume other functions when sent out-of-record. For example, the FIGS code occurring out-of-record marks the beginning of a correct message record as mentioned above. Also, the in-record carriage return code (CR) is transmitted out-of-record by the punch-receiver as a check code to indicate agreement of the information bit totals compared by the system accuracy check (SAC) operation after each message, signalling the reader-sender to proceed to the next message. The in-record line feed code (LF) is utilized out-of-record to indicate a non-check calling for re-transmission by the reader-sender while the three codes CR, FIGS and LF occurring in that order in-record comprise the end-of-record code group mentioned above.

In the out-of-record condition, the LTRS code becomes the standby (SBY) code and is used by either the reader-sender or the punch-receiver to delay record processing and retain control of the system at the origin of the signal. This code is, in the preferred embodiment of the invention, comprised of perforations in all of the five channels and, being the same pattern produced by deletion of an incorrect message, retains control at the reader-sender when it occurs in the original tape to prevent operation of the punch-receiver while the tape reader passes messages which have been deleted. Another signal, for example, the in-record "V" code when sent out-of-record from either station becomes the TEL code, calling for alternate means of communication and placing both stations in the standby condition.

Returning to the general description of the system, as the tape is advanced through the tape reader A, the reader-sender, when in "out-of-record" condition, searches for the FIGS code indicating the beginning of a record. When this occurs, the resulting signal is applied to the signal analyzer B through the cable *f*, the send-receive control C is changed to the in-record and "send" conditions through the cable *g* and it, in turn, switches the transmitter-receiver P to the transmit state through a cable *j*. The reader-sender is now in the proper condition to transmit the tape record and transmission is started by actuation of the ring control L through a line *k* from the send-receive control C. This begins the sequential operation of the electronic ring M which, as described above, successively biases the first grids of the series of thyratrons in the thyratron bank N, the second grids of selected thyratrons in the bank having been conditioned through a cable *p* from the signal analyzer according to the tape perforations detected by the reader A. Simultaneous conditioning of both grids in this manner causes the selected thyratrons to conduct, applying a sequential series of timed pulses to the transmitter-receiver P, now in the transmit state, which are sent to the punch-receiver on the lines *a*. When the electronic ring M has completed its cycle of operation, it cuts off the plate current in the thyratrons in the bank N, restoring them to the nonconductive state. Meanwhile, a signal is sent to the tape reader through cables *s* and *y* to read the next code character, the tape having been advanced one column after the end of the last reading operation. Transmission of the message continues in this manner until a CR, FIGS, LF group indicates the end of the message record. After transmitting these codes, the tape is advanced one more position to send the SAC number and then stops to await a check signal from the punch-receiver. If such arrives then the reader commences to transmit the next following record. The re-transmission by the reader-sender of a particular record contained within a block of records in the paper tape is initiated by the receipt from the punch-receiver of a "not check" code, which indicates that the SAC code transmitted at the end of this particular record does not agree with the SAC code derived by the punch unit. Such a re-transmission is performed and controlled by the reader control unit D, the repeat unit H, and the recover control unit J which are shown in block form in FIGURE 1. A first counting means is provided in unit J for counting the number of records correctly transmitted from the beginning of a block in which the incorrect record is found. Then, on receipt of the "not check" code from the punch, the tape is moved in the reverse direction until it returns to the error notch found at the beginning of this block. It is then immediately stepped forward so as to pass over the good records without transmitting them until it reaches the beginning of the incorrect record. A second counting means is located in unit J which counts the number of records passed over by the reader during this time so that, upon equal comparison with the count in the first counting means, the tape is stopped at the beginning of the incorrect record. Thereafter, upon receipt of another "not check" code from the punch, the tape moves forward and the re-transmission of only the incorrect record is initiated. The above procedure is repeated until the message is reproduced correctly as determined by exact comparison of the SAC totals, or until a predetermined number of unsuccessful attempts have been made, as counted by a repeat unit H in the reader-sender, after which the system is automatically switched to the standby condition through a cable *x*.

In the following detailed description of the various elements of the system, it is to be understood that each of the connecting cables indicated by a reference character corresponds to the line on FIGURE 1 having the same reference character and that the conductors within each cable are distinguished at either end by the reference number adjacent the end of the cable. Further, most of the relays are comprised of a pick coil (P) which actuates the relay, a hold coil (H) capable of retaining the relay in the actuated condition after the pick coil is de-energized, and a series of movable contacts and fixed points associated therewith. It is to be noted that in most cases the positive conductor leading to each relay coil is connected to the upper left and the negative or grounded conductor to the lower right of the coil as viewed in the schematic drawings. Also, appropriate spark-suppressing resistor-capacitor combinations may be wired in parallel with those relay coils which are actuated by other relay contacts in the usual manner, thus preventing burning or pitting of the contacts. If desired, direct current power may be supplied to the terminals indicated in the drawings from separate forty, forty-eight volt and eighty volt power supplies (not shown). However, the embodiment described herein is adapted to utilize forty-eight and eighty volt sources in the signal units. As illustrated in FIGURE 2, the negative side of the forty-eight volt supply, indicated in the drawings by a minus sign, is connected to the eighty volt positive terminal. In cases where different voltages are utilized in the same circuit, dropping resistors are shown to cause the appropriate voltage reduction. Also, in circuits wherein the current is intended to flow in one direction only, the diode rectifiers illustrated in the drawings are adapted to prevent the flow of current in the wrong direction.

*Reader-sender signal unit*

In order to convert the simultaneous, or parallel, bits of information comprising each code as recorded in each column on the paper tape into sequential or serial information for transmission on the lines *a*, a signal unit, also known as a transceiver, substantially as described in U.S. application, Serial No. 460,662, filed October 6, 1954, is utilized. Connected to the lines *a* is the transmitter-receiver unit P adapted to send or receive signals from a distant station according to the position of an internal relay (not shown), actuated through two conductors *j*–1 and *j*–2 from the send-receive control unit C shown in FIGURE 4. The conductors *j*–3 and *j*–4 are joined in the send-receive control when a key trigger relay 13 is energized, causing a receive switch pentode in the signal unit to be reset. Before any operation can be started a time delay mechanism within the signal unit permits all the electrical components to warm up sufficiently after power is applied. At the completion of the warm up period, a signal is sent to the send-receive control C through the conductor *j*–5 to place it in operating condition.

Within the signal unit the ring control L includes a start switch, which may, for example, be a pentode tube adapted to initiate the electronic ring operation upon receipt of a trigger pulse through the line *k* from the send-receive control or *b* from the transmitter-receiver. Operation of the electronic or "Leslie" ring M establishes a time base for the sequential transmission of coded information bits, the ring comprising a series of dual thyratron tubes arranged to operate in the manner described in U.S. application Serial No. 460,662, filed October 6, 1954 and in the "Proceedings of the IRE," August 1948, pages 1030–1034. Ten thyratrons arranged to fire in succession at a predetermined rate may be utilized in the ring, the first providing a synchronizing pulse (No. S), the next five transmitting or detecting the code information bits (Nos. 1 through 5), and the last four (Nos. 6 through 9) being arranged to complete operating circuits and to permit a time delay between code transmissions. In the present embodiment, each thyratron fires approximately 5.5 milliseconds later than the stage immediately preceding it. As each of the ring thyratrons fires, it conditions the first grid of a corresponding thyratron in the bank N, causing it to conduct if the second grid of the N bank thyratron has been similarly conditioned. Actuation of the seventh ring thyratron (No. 6) and the corresponding code thyratron (No. 6) in the bank N completes appropriate circuits in the send-receive control C through the line *s*–2 to cause the signal analyzer B to analyze a received code signal if the reader-sender is in the receive condition, or, if in the transmit condition, a tape advance operation is instead initiated through the line *s*–3. The last N bank thyratron (No. 9) supplies a reset signal at the end of each cycle through the *s*–1 conductor to the send-receive control. The ring is thereafter internally stopped to await another trigger pulse.

The second grids of the five code thyratrons in bank N (Nos. 1 through 5) are internally connected to the transmitter-receiver through the cable *b* to receive signals from the lines *a* when the signal unit is operating as a receiver, the second grids being switched to the signal analyzer B through the cable *p* when the unit is conditioned to transmit. Similarly, the five code thyratron plate electrodes are switched from the cable *e* to a cable *t* leading to the transmitter-receiver P when the unit is changed from a receiver to a transmitter. Following the reset pulse, a time delay permits mechanically operated components such as the punch, the circuit breakers in a timing unit K (FIGS. 1 and 2), and a reader-clutch to maintain synchronism with the electronic ring M.

*Tape reader A*

The tape reader A illustrated in FIGURES 2 and 9 may be one of the type described in U.S. Patent Number 2,846,007 to Barbeau, and includes cam means to transmit motion from a motor driven shaft 303 to the coded tape 27 to advance it stepwise through a perforation detector, schematically illustrated in FIGURE 2 by the five contacts 28 and contact plate 29. Contacts 28 are connected to the signal analyzer B through conductors 1–5 of cable *f*, and conductor *q*–1 provides voltage to plate 29 when the tape is read. Block separating notches 27*b* at the edge of the tape are detected by contact 30 and a separate contact plate 31, for example, which cooperate to complete a circuit to the reader control unit D through the conductors *q*–3 and *q*–2 respectively. In order to prevent operation of the duplicating system when no tape is in position in the reader, a runout switch 32 is adapted to cut off voltage supplied through conductor *r* to a standby unit E (FIGURE 1), when tape 27 runs out.

As illustrated in FIGURE 9, a motor 300, which is constantly running, may have its shaft 304 selectively coupled to cam shaft 303 through a reader-clutch 301 which is activated by a positive voltage appearing on input line *y* to a control relay (not shown) if the circuit is further completed to the negative terminal through a closed circuit breaker CB–1 actuated by a cam found on shaft 303. Upon reader-clutch 301 becoming actuated, it will lock in this actuated position until shaft 303 has made a single complete revolution, whereupon clutch 301 will be deactuated and so de-couple shafts 304 and 303 unless there is again present a signal on conductor y at this time. Attached to shaft 303 are groups of control units which are provided for various purposes. Pin sensing cams 302 are provided to lower contacts 28, shown in FIGURE 2, into sensing position with tape 27 when shaft 303 reaches a certain angle of rotation. The tape forward control unit 305 is utilized to effectively transmit energy from the rotating shaft 303 to tape 27 in order to advance the tape one character position in the forward direction when shaft 303 reaches a particular angle of rotation, while the tape reverse control unit 306 is provided to selectively step tape 27 one character position in the reverse direction when shaft 303 reaches a certain angle of rotation. In the absence of signals on conductors q–5 and q–4 during a rotation, the control of tape forward unit 305 enables it to be effective so that tape 27 is moved forward one character position. In the presence of a signal on q–5 and the absence of a signal on q–4 neither tape forward unit 305 nor tape reverse unit 306 will be effective, so that tape 27 will be motionless during the particular rotation of shaft 303 in which this combination of control signal occurs. However, in the presence of signals on both q–5, q–4, tape forward unit 305 will be ineffective while tape reverse unit 306 will be effective to step tape 27 one character position in the reverse direction.

When cam shaft 303 is at rest in its 0° angular position, CB–1 always closes the reader-clutch 301 circuit so that upon the application of a signal on conductor y, the reader-clutch will be actuated and locked for the duration of a single complete rotation of shaft 303. However, CB–1 opens when shaft 303 reaches an angular position of 15 degrees measured from its rest position, but this does not cause de-coupling of shafts 304 and 303. During the course of a complete rotation of shaft 303, contacts 28 will first be brought into sensing position with tape 27 by means of pin sensing cams 302, and then the stepping of the tape will be governed by the controls 305 or 306 near the end of this shaft rotation. It is here emphasized that once reader-clutch 301 is actuated so as to initiate rotation of shaft 303, the disappearance of the signal on conductor y, or Y the opening of CB–1 will not cause clutch 301 to become deactivated until the shaft has made a single complete 360 degree rotation. At this point, if there is again a signal present on line y, the reader-clutch will not drop out but will remain actuated so as to cause another single 360 degree rotation of shaft 303.

The timing unit K associated with tape reader A is more particularly shown in FIGURE 2 and comprises a series of circuit breakers designated CB–2 through CB–8 each being actuated by shaft 303 during a revolution. As has been noted, tape 27 may be either stepped forward or backward one character position during each rotation of shaft 303, or else the tape 27 may remain motionless in case there is a signal on q–5 in the absence of a signal on q–4. As illustrated in FIGURE 3, wherein the bars represent the time during which each circuit breaker is closed during a shaft rotation, positive voltage is applied for certain periods during each shaft cycle to each of the conductors n–2 through n–8 by the correspondingly numbered circuit breakers. The circuit breaker CB–1 shown in FIGURE 9 has the same closing time of operation as CB–8, but as described above, it completes a circuit path for reader-clutch 301. It will be noted that breakers CB–2 through CB–7 supply 48 volts positive to the corresponding conductors in the cable n while CB–8 connects n–8 to n–9. The latter two conductors supply 80 volts positive except during the reset time of the electronic ring M. In addition, FIGURE 2 shows conductor y to which positive voltage is applied to actuate reader-clutch 301 when it is desired to rotate shaft 303.

*Signal analyzer B*

As shown in FIGURE 2, the signal analyzer B comprises a group of relays 20, 22, 23, 25, and 26, each wired to one of the tape reader contacts 28 through the cable f and connected to the plate electrodes of the corresponding code thyratrons in the bank N through contacts 409–13 to 409–17 normally closed, and the cable e if the signal unit is in the receive condition. When a thyratron reset relay 18 (FIG. 4) is de-energized, the normally closed 18–1 contact is restored and an eighty volt potential may be applied through the pick coils of each of these relays to the code thyratron plates to actuate appropriate relays when the reader is receiving information. When the reader is in the transmit condition, these relays are actuated from the reader contacts 28 through the 18–1 contact to the negative terminal.

Once actuated, each relay hold coil retains the relay in the actuated position through one of its own contacts, for example, the hold coil of the relay 20 is energized through the normally open point, now closed, of the contact 20–1, provided either a SBY–3 relay 58 (FIG. 7) or the key trigger relay 13 has completed a circuit to the forty-eight volt positive terminal by closing the normally open contact 58–2 or 13–2, respectively. If the reader-sender is transmitting codes, the tape perforation signals detected by the contacts 28 are also applied by way of the code relays to the appropriate conductors in the cable p to the second grids of the code thyratrons in bank N. This causes the appropriate thyratrons in the bank N to conduct when the first grids are sequentially actuated by the electronic ring M, sending the desired code signal out on the lines a to the punch-receiver. It is to be noted here that the key trigger relay 13 is actuated only when the reader is in the send condition and that when the unit is in the receive condition the code relays are held by the code thyratrons through the e cable until the thyratrons are reset, the thyratron plates being internally connected to a positive voltage source when in the send condition and being switched to the conductors e–1 through e–5 to analyze a received signal.

In order to detect the operational codes punched in the tape or received from the punch-receiver, additional contacts form a network which completes appropriate circuits in the send-receive control C through the cable g. For example, the FIGS code, indicating the start of a message, is represented by holes in the first, second, fourth and fifth channels of the tape or by actuation of the corresponding code thyratrons and is detected by energization of the relays 20, 22, 25 and 26. This connects the conductors 3 and 5 in the g cable through the contacts 23–5 normally closed, 20–4 normally open, now closed; 25–4 normally open, now closed; 22–5 normally open, now closed; and 26–3 normally open, now closed, leaving the other conductors unconnected. Similarly, the CR code, consisting of a single perforation in the fourth channel, actuates the relay 25 only, connecting the conductors g–2 with g–5 through the contacts 22–4, normally closed; 25–3 normally open, now closed; 20–3 normally closed; 22–3 normally closed and 26–3 normally closed, the other conductors remaining unconnected. The LF code, which is a single perforation in the second channel, energizes the relay 22 and links the conductors g–5 with g–6 through the contact 26–3 normally closed, 23–3 normally closed, 20–3 normally closed, 25–3 normally closed, and 22–3 normally open, now closed.

In order to fully understand the following description of the circuits and operation of the remaining reader-sender units, particular reference should be made to the sequence diagrams of FIGURES 13 through 20, which show the approximate times at which the various relays are energized, held, and de-energized. FIGURE 12*b* is the legend for these sequence diagrams wherein it may be seen that with each relay, the energization time of its pick (P) coil and of its hold (H) coil is denoted. Furthermore, the diagonal line at the beginning of the signal bar represents the delay between the time of initial energization of the pick coil and the time that the relay armatures transfer. The diagonal line at the end of the signal bar represents the delay between time of de-energization of the hold coil and the time that the armatures transfer back to their normal position. The maximum time delay for armature transfer is approximately 5 milliseconds. It also should be remembered that cam shaft 303 can make a complete revolution in 50 milliseconds (1200 r.p.m.), while the electronic ring M requires 55 milliseconds to run through a cycle. Rotation of cam shaft 303 in the sequence diagrams is indicated by a horizontal line with the limits of 0° (360°)–360°. Furthermore, unless otherwise indicated, it is presumed that tape 27 will be moved forward one character during the latter portion of each cam shaft rotation. FIGURES 11 and 12*a* illustrate the relative positions of FIGURES 13 to 20 to each other, so it is seen that two complete sequence diagrams are formed.

*Send-receive control C*

After the signal unit warm up period mentioned above, a signal applied through the conductor *j*–*5* energizes a delay relay 76 in the send-receive control shown in FIGURE 4 and this relay is held in an actuated position thereby until the power is turned off. As long as tape is properly positioned in the reader, a run relay 12 remains energized through the switch 32, the *r* line, contacts 72–7 and 75–3 in FIGURE 7, and conductor *w*–20. Opening of the 76–2 contact permits operation of the signal unit by disconnecting the conductor *j*–*3* from ground and when the 76–1 contact is closed, depression of the start key actuates a start relay 10 through the contacts 76–1 and 12–1, now closed, and 6–6, normally closed. Power is applied to the start relay hold coil to retain the relay in the actuated position through the contacts 10–1 now closed and 9–3 normally closed, and the conductor *w*–20. However, the tape remains stationary at this time.

It will be remembered that control of the five channel tape transmission system is normally retained at the punch-receiver and that receipt of a CR code from the punch-receiver conditions the reader-sender to start moving and reading tape. This is accomplished by the circuitry associated with an auto start relay 9, shown in FIGURE 4, an analyze relay 16 being energized by the conductor *s*–*2* from the seventh N bank thyratron (No. 6) in the signal unit, which is energized at No. 6 ring time, and the normally closed contacts 18–2 and 409–12.

When the CR code from the punch is detected, ring M begins to run and relay 25 is picked by No. 4 thyratron in N bank at No. 4 ring time. The conductors *g*–*2* and *g*–*5* are connected as described above, and a circuit is subsequently completed from the forty-eight volt positive terminal through the normally open 16–2 contact, which is closed by the firing of No. 6 thyratron in N bank, through the lines *g*–*5* and *g*–*2*, contact 409–4 normally closed, contact 2–3 normally closed, and the conductor *w*–18 which leads to the standby unit E and TEL unit F. If the receiver is not in the standby or TEL condition, the conductor *w*–18 is connected to *w*–11, causing the auto start relay 9 to be energized, the hold coil retaining it in the actuated position through the contacts 9–1 now closed, 93–9 normally closed, 6–3 normally closed and 12–3 normally open, now closed. Closing of contact 9–2 applies a voltage to line *y*, SBY relays 55 and 58 being unenergized at this time. Because cam shaft 303 is at this time motionless in its zero degree position, CB–1 is closed and completes the reader-clutch circuit, and reader-clutch 301 is actuated so as to cause a single full revolution of shaft 303. Since the shaft speed is approximately 1200 r.p.m., the time to complete one revolution is approximately 50 milliseconds. In the sequence diagram of FIGURE 13, for example, rotation of shaft 303 is indicated by noting that it begins to move from its 0 degree position at the time that reader-clutch 301 is actuated (its relay has become fully energized). It continues to rotate for approximately 50 milliseconds until it returns to its 360 degree (or 0 degree) position. The actual stepping of tape 27 one character position occurs during the latter portion of this shaft revolution at about 240 degrees. As before described, when shaft 303 reaches its 15 degree angular position, near the beginning of each cycle of rotation, CB–1 opens and causes the relay circuit of the reader-clutch 301 to be de-energized. However, the clutch itself is locked in its actuated position and will not be released until the shaft rotates a full revolution. Meanwhile, the signal unit, which picked analyze relay 16 through *s*–*2* after receipt of the CR code from the punch, finally fires the final thyratron in bank N (No. 9) at No. 9 ring time which sends current through conductor *s*–1 and contact 409–18, normally closed, to actuate reset relay 18 momentarily. The opening of contact 18–1 interrupts the plate circuit of the code thyratron No. 4, while the opening of contact 18–2 also shuts off thyratrons 6 and 9. Thus, relays 25, 16, and 18 are dropped.

Also during the first rotation of shaft 303 and before the tape steps one character in the forward direction, sense pins 28 are thrust into contact with the tape in order to determine what character, if any, lies beneath them at this point. If no FIGS code is detected during this time, then the motor operation of the reader is not changed. That is to say, auto start relay 9 remains energized so that a voltage is continuously applied to line *y*. Upon shaft 303 reaching its 280 degree position during its first rotation, CB–1 again closes so as to complete the circuit through the reader-clutch magnet. This means that when the shaft finally reaches its 360 degree (0 degree) position, the reader-clutch is not de-actuated, so it is effective to immediately initiate a second rotation of shaft 303 which therefore does not stop moving. This in turn will again force sense pins 28 into contact with another character portion of the tape, one step removed from that sensed during the first rotation. Thereafter, the tape will again be advanced during the latter portion of the second rotation so as to step it to the third character position which will not be sensed until the third rotation of shaft 303. Shaft 301 will continue to rotate without stopping until a FIGS code is detected.

Thus, as the tape moves through the reader, it searches for a FIGS code indicating the beginning of a record. When detected this code links the conductors *g*–*3* and *g*–*5* as described above, the relays 20, 22, 25 and 26 being actuated through the contacts 28, the plate 29 (FIG. 2), the conductor *q*–1, the contact 47–2 normally closed, and the conductor *n*–6 (FIG. 5) when CB–6 closes at 72°. This energizes a send relay 5 and record relay 6 through CB–5 closed at 147°, normally open contact 16–2, the conductors *g*–*5* and *g*–*3*, and the contact 2–5, normally closed, which puts the reader-sender in record. Also, the key trigger relay 13 is picked through the normally closed contact 2–6 and conductors *w*–7 and *w*–8 of a cable *w* (FIG. 1). Linking of those conductors by the contact 58–12 and contact 409–6, both normally closed, as shown in FIGURE 7, triggers the electronic ring through the contacts 18–2, normally closed, 13–6 normally open, now closed, and the line *k*. However, this ring operation cannot actually be initiated until the RS relay (not shown) in the signal unit is dropped.

Actuation of the send relay 5 connects the negative side of a relay 2 to the negative terminal through the normally open contact 5–2, now closed, and the contact 16–1 normally closed. The positive side of relay 2 is connected to a positive terminal through contact 409–9, normally closed. This arrangement assures that the send relay 5 is picked through the contact 2–5 before that contact transfers, the hold coil being energized thereafter through the contacts 5–1, 6–2 and 12–2, normally open, now closed, until the end of the record. The record relay 6 is similarly held through the contacts 6–1 and 12–2, the h–1 and h–2 conductors being linked through normally closed contact 42–2 of relay 42, as shown in FIGURE 5. Transfer of the contact 2–7 switches the transmitter-receiver P to the transmit condition through the conductors j–1 and j–2, by dropping the RS relay (not shown) in the signal unit. Upon dropping of this RS relay, the voltage on conductor k may now initiate operation of the M ring, as noted above. Furthermore, in the N thyratron bank, the output from the seventh stage, which is associated with the seventh stage of the M ring (No. 6) is also switched from conductor s–2 to conductor s–3. The closing of the 2–1 contact now permits receipt of clutch actuation pulses at No. 6 time from the thyratron bank N in the signal unit through the conductor s–3. Another switching function occurring in the signal unit is to disconnect the plates of the five code thyratrons from cable e and connect them to an independent source of power, while at the same time causing their second grids to now be responsive to signals on cable P from signal analyzer B, instead of from b, see FIGURE 1.

When record relay 6 picks, auto start relay 9 is restored to its de-energized position by transfer of contact 6–3, breaking the auto start circuit to reader-clutch 301 and placing its relays under the control of clutch relay 19, which is energized through the normally open contacts 5–3 and 2–1 now closed, conductors n–8 and n–9, corrected by CB–8, normally closed contact 18–3, and the conductor s–3 upon which appears a signal beginning only at No. 6 ring time. However, before this occurs, the FIGS code which was sensed by the code relays 20, 22, 25, and 26 is transmitted to the punch. It will be noted that these code relays are held through contact 13–2 since relay 13 has picked before the pick coils of these code relays are de-energized. Furthermore, since transmit relay 2 has been picked before the initiation of ring operation, the reader-sender is in transmit condition and thus will be able to transmit signals to the punch which it receives from thyratron bank N. As signals are successively applied to the second grids of the code thyratrons of bank N by the successive operation of the stages in ring M, the first grids of the selected code thyratrons have been previously raised by selected conductors p which in turn have been energized by operation of their respective code relays in the signal analyzing unit B as shown in FIGURE 2.

It can be seen from the sequence diagram of FIGURES 13 to 16 that the particular rotation of shaft 303 during which the FIGS code at the beginning of the record was sensed, has been completed and come to its 360 degree (0 degree) position before the entire FIGS code has been transmitted and before No. 6 ring time is reached. Since relay 9 has been de-energized before this position is reached, however, no power is now applied to conductor y. Therefore, cam shaft 303 is idle until the No. 6 ring time is reached, whereupon a signal appears on connector s–3. In order to complete the circuit of clutch 19 at this time however, it is necessary that conductors n–8 and n–9 be joined. This is the case since CB–8 is closed due to the fact that shaft 303 is at its 0 degree position by the time that a signal is applied to s–3. Relay 19 is not picked. Thus, the clutch relay circuit to connector y is completed from the +48 volt terminal through contacts 12–3, 6–3 and 19–2 so as to energize the relay of reader-clutch 301 and initiate a complete rotation of shaft 303 as above described. Key trigger relay 13 has been held through contacts 13–1, 19–1, the conductor w–16 and contact 68–2 in FIGURE 7 until clutch relay 19 is actuated, whereupon relay 13 drops and so drops code relays 20, 22, 25, and 26. Furthermore, at No. 9 ring time, a reset pulse appears on conductor s–1 from No. 9 thyratron in N bank which picks reset relay 18 whose normally closed contact 18–3 now open, causes clutch relay 19 to drop. Relay 19 might alternatively be dropped by the opening of CB–8 at the 15 degree position of shaft 303 after it begins to rotate.

During the following cam shaft rotation, whose initiation has just been described, the next character on the tape is read at approximately 72 degrees, then key trigger relay 13 is re-energized through the line n–5 and contact 2–6 normally open, now closed, at 147 degrees so as to initiate operation through conductor k of the electronic ring, which thus causes that character to be sent to the punch. Furthermore, at No. 6 time of this ring operation, clutch relay 19 is again re-energized as described above so as to initiate a new cycle of rotation of the cam shaft and de-energize relay 13. In this manner, the reader-sender progresses stepwise through the character columns comprising a message, transmitting each character and awaiting the end of the record code group composed of the CR, FIGS, and LF characters.

When the end-of-the record code group is detected by the signal analyzer and the reader control D as described below, the characters comprising it are transmitted in the same manner as described above, together with the SAC number recorded immediately after it on the tape. Meanwhile, the send relay 5 is held during transmission of the SAC code through the contacts 5–1, 42–2 normally open, now closed, the conductors h–1 and h–6 and the normally open contact 12–2, now closed, until after the SAC–2 relay 42 (FIG. 5) is restored, permitting the SAC code total to be transmitted to the punch-receiver. When the record relay 6 is restored by the transfer of the 41–2 contact, reader-clutch operation through the normally open contact 6–3 is prevented, but the clutch relay 19 is still actuated, dropping out the key trigger relay 13 which was held through the contact 19–1. This in turn restores the code relays by opening of the contact 13–2 in FIGURE 2, the code thyratrons being internally reset at the end of the electronic ring cycle.

It will be noted that the send relay 5 is held after the contacts 6–2 and 42–2 have opened through the normally open contacts 5–1, 13–9 and 12–2, now closed, until the clutch relay 19 is energized, opening the 13–9 contact but closing the 19–3 contact. Relay 5 is therefore not dropped until relay 19 is de-energized, opening contact 19–3. This assures continued operation of the signal unit as a transmitter until the thyratron reset relay 18 has been actuated through the line s–1 at the end of the electronic ring cycle. Transfer of the 5–2 contact then disconnects the ground side of the relay 2, opening the 2–6 and 2–7 contacts to restore the transmitter-receiver P to the receive condition and blocking further clutch actuation pulses from the conductor s–3.

As described above, receipt of an LF code out-of-record indicates a non-check of the SAC numbers compared at the punch-receiver. This applies a forty-eight volt positive signal through the normally open contact 16–2 now closed, the conductors g–6 and g–5, the normally closed contact 409–3, normally closed contact 2–2, conductor o–1 in a cable O (FIG. 1), and contact 47–7 of relay 47 (FIG. 5) to relay 93 in the repeat unit (FIG. 6) to initiate re-transmission of the message as will be subsequently described.

*Reader control D*

As shown in FIGURE 5, the reader control D comprises a network adapted to respond to certain functional codes and operate the tape reader accordingly. When the first FIGS code is detected at the beginning of a message record, a signal is transmitted to reader control FIGS–1 relay 39 through conductor g–3, normally open contact 6–9 now closed by the same signal appearing on conductor g–3, and conductor h–4. Although FIGS–2 relay also eventually picks, as described below, there will never be an LF code immediately following this first FIGS code at the beginning of a message so that undesired stopping of the tape at this point is avoided. After both FIGS relays have dropped, the reader control is now in condition to receive the CR, FIGS, and LF code group at the end of a record in the proper order. Any two of these codes appearing in the proper sequence are sufficient to indicate the end of the record to the reader control.

When the tape reader senses the CR code, connecting the conductors *g*–2 and *g*–5 as described above CR–1 relay 35 is picked through the conductor *h*–5, the contact 2–3 normally open, now closed, and normally closed contact 409–4, as shown in FIGURE 4. (It will be remembered that the relays 2, 5, 6 and 12 remain energized throughout transmission of the message record.) The relay 35 is held through the contact 35–1 and conductor *n*–2, carrying the relay hold over into the next reading cycle, CR–2 relay 36 being actuated through the contact 35–2 and the conductor *n*–3 at 60° and held through the contact 36–1 and line *n*–4 to 346°. Meanwhile CR–3 relay 37 is energized through the contact 36–2 and line *n*–7 at 240°, its hold coil retaining it through the 37–1 contact and conductor *n*–2 to 140° of the second cycle after the CR code is sensed. CR 4 relay 38, being energized through the contact 37–2 and line *n*–3 and held through the contact 38–1 and conductor *n*–4, carries the CR signal to 346° of the second cycle.

During the cycle following CR detection, the FIGS code is sensed through the line *h*–4, normally open contact 6–9, now closed, or contact 2–5 normally open, now closed, the *g*–3 and *g*–5 conductors being linked in the analyzer, picking the FIGS–1 relay 39 which is held through the contact 39–1 and line *n*–2. This picks the FIGS–2 relay 40 through the contact 39–2 and conductor *n*–3 at 60° of the following cycle, which is thereafter held through conductor *n*–4 until 346° of this cycle. When the conductors *g*–5 and *g*–6 are connected by detection of the LF code in the second cycle following detection of the CR code, LF relay 43 is actuated either through the normally open contact 38–2 now closed, or through normally open contact 40–4, now closed, the *h*–3 conductor, normally open contact 2–2, now closed (FIG. 4), and normally closed contact 409–3. This relay is held into the next cycle by the conductor *n*–2 through the contact 43–1, SAC–1 relay 41 being picked meanwhile through the contacts 40–3 and 38–3 normally open, now closed, and the conductor *n*–7, and held through the contact 41–1 and line *n*–2. It will be observed that this occurs even if the LF relay 43 was not actuated. Moreover, a circuit would be available through the contact 38–3 normally open, 40–2 normally open now closed, and 43–2 normally open, now closed, to pick the SAC–1 relay 41 even though no CR code was detected. Or, if no FIGS code had been detected, SAC–1 may be picked by closed contacts 43–2 and 38–3. Actuation of the SAC–2 relay 42 takes place through the contact 41–3 and line *n*–3 and it is held by the contact 42–1 and conductor *n*–4, the record relay 6 hold being taken over by the contact 41–2 from 42–2 until the relay 41 is restored, thereby de-energizing the record relay 6 to switch the reader-sender to the out-of-record condition.

With the transfer of contact 6–3 to its normally open position, no power can be applied to conductor *y*, so that a rotation of cam shaft 303 will not be initiated following that during which the SAC member was sensed. In other words, the tape steps off the SAC character and then moves no more until a signal is received from the punch-receiver.

*Standby and TEL units E–F*

In order to avoid unnecessary operator attention at both stations when transmisison is temporarily halted, either station may be placed in a standby condition awaiting an automatic or manual operation at the other station. As mentioned above, the standby signal (SBY) is the out-of-record LTRS code comprised of perforations in all five tape channels or pulses at all five of the electronic ring code positions. This signal may be transmitted at any time from either station, for example, by manual depression of the standby key, automatically from the reader-sender when successive attempts to send a record have failed, or automatically from the punch-receiver when the tape supply runs low. However since the SBY signal cannot be transmitted while the system is in record, a memory is set up if a message is being sent and the SBY code is transmitted at the end of the message.

When it is desired to communicate with the other station by a different means, for example, by telephone, a TEL signal is transmitted by depression of the TEL key. Since this signal is the "V" code out-of-record, it likewise cannot be sent during a message transmission, but is automatically delayed until the end of the message.

The standby and TEL networks for the reader-sender are illustrated in FIGURE 7. In view of the previous description of the normal operating mode of the reader, it was not thought necessary to provide a sequence chart for the relays of FIGURE 7. It will be seen that depression of the standby key energizes SBY–1 relay 53, the hold coil retaining it through the contact 53–1, the conductor *w*–1, contacts 10–4, and 72–11 in FIGURE 4, setting up a memory that the key has been operated. Receipt of a check code from the punch, indicating it is out-of-record, energizes SBY–2 relay 55 through contacts 68–5, 53–3 normally open, 71–2 normally closed, the conductor *w*–18, the contact 2–3 normally closed, normally closed contact 409–4 (FIG. 4), the conductors *g*–2 and *g*–5 which are linked by the receipt of the CR code, and the normally open contact 16–2 when the analyze relay 16 is energized. The relay 55 is held through the contact 55–1, the line *w*–1 and the contact 10–4, and closing of the 55–6 contact applies positive voltage through contact 68–8 to actuate the SBY–3 relay 58, its hold coil being energized through contacts 58–1 and 68–3.

It will be observed in FIGURE 2 that operation of the relay 58 closes a series of contacts to apply grid potential to all the code thyratrons in the bank N through the cable *p*, the 13–4 contact being closed by the actuation of the key trigger relay 13 (FIG. 4) through contacts 55–5, 82–3, 68–7 and the conductor *w*–8 (FIG. 7). Transmission of the SBY signal begins when the contacts 58–10 and 13–5 in FIGURE 4 close, connecting the relay 2 to negative through the contact 16–1, thereby transferring the contacts 2–6 and 2–7 to switch the signal unit to the transmit condition through *j*–1 and *j*–2. Inasmuch as the SBY code is to be transmitted once only, the clutch actuation signal from the signal unit received through *s*–3 is applied to interlock relay 67 through the contact 2–1, the line *w*–9 and the contact 58–9, the positive potential being received through the conductors *w*–15 and *n*–8. Transfer of the 67–2 contact picks non-repeat relay 68 which is held through the contact 68–1, the conductor *w*–14, contacts 6–5 and 72–8 in FIGURE 4 until released by depression of the start or TEL key. The non-repeat relay 68 also restores the SBY–3 relay 58 by opening the contact 68–3, thereby removing the thyratron grid potential applied to the series of 58 contacts shown in FIGURE 2 and releasing the relay 2 which was held through the contact 58–10 in FIGURE 4. This converts the signal unit to the receive condition, the key trigger relay 13 being restored by opening of the 68–7 contact.

In order to eliminate the SBY condition the start key is depressed, actuating the start relay 10 through the contacts 6–6, 76–1, and 12–1, energization of the relay 55 hold coil being maintained after the contact 10–4 breaks through the line *w*–5 until the start key is released, thus permitting the auto start relay 9 to be picked through the contact 10–5, the line *w*–4, the contact 55–4 and the conductor *w*–11. Sensing of the initial FIGS code in the next message picks the record relay in the manner described above and drops the non-repeat relay 68 through the conductor $w$–14 by opening the contact 6–5.

Another condition which automatically establishes the standby state at the reader is the sensing of an out-of-record LTRS code as, for example, in a deleted portion of the original tape. Remembering that detection of this code connects the conductors $g$–4 and $g$–5, it will be noted that a circuit is completed from the line $n$–5 through the normally closed contact 16–2, the conductors $g$–5, $g$–4, the normally closed contacts 68–6, 6–7, and 408–7, normally open contact now closed, and the line $w$–17 to pick the SBY–3 relay 58. When the circuit breaker CB–7 applies power to the line $n$–7 in the same cycle, the key trigger relay 13 is picked through the line $w$–8, the contact 58–12 normally open, and the conductor $w$–3 causing the standby code to be transmitted. The interlock relay 67 and the non-repeat relay 68 block further transmission as described above while the reader advances additional LTRS codes, reader-clutch being inactivated by opening of the 58–8 contact in FIGURE 4, thus permitting the tape to be advanced at maximum speed. When the FIGS code is detected, both stations go into record and the standby state is eliminated as described above.

Run-out of tape in the reader likewise puts both stations into the standby condition in a similar manner, the trailing end of the original tape being punched with LTRS codes. This time, however, when the run-out switch 32 (FIG. 2) in the reader opens, it breaks the circuit to the run relay 12 through the conductor $w$–20, dropping the auto start relay 9 and the reader-clutch which were held through the contact 12–3. Meanwhile, run-out relay 97 is picked through the contacts 68–3, 58–1, the line $w$–6, the contact 13–8 and the conductor $w$–12 and is held through the contacts 72–8, 6–5, the line $w$–14, and the contact 97–1 to signal the operator by a buzzer (not shown), and SBY–4 relay 61 is picked through the contacts 58–11, 53–2, the line $w$–10, the contacts 9–4 and 72–11 and held through the contacts 61–1 or 97–3 to turn on an SBY indicator light (not shown).

As will be subsequently discussed, repeated unsuccessful transmissions of a message pick the SBY–5 relay 62 which is held through the contact 62–1, the line $w$–1 and the contact 10–4. In this case, transfer of the 62–3 contact picks the SBY–2 relay 55 through the contact 68–5 causing transmission of the SBY code in the manner described above.

Receipt of a TEL code, which can be transmitted only when the system is out-of-record, energizes the code relays 22, 23, 25, and 26, connecting the conductors $g$–1 and $g$–5 in FIGURE 2. When the analyze relay 16 (FIGURE 4) is pulsed by the signal unit, a circuit is completed through the contact 16–2 normally open, now closed, the conductors $g$–5 and $g$–1, the normally closed contacts 409–5 and 2–4, and the line $w$–19 to pick TEL–3 relay 75 (FIGURE 7), the hold coil being maintained through the contact 75–1 and a reset key. The run relay 12, which was held through the contact 75–3 and the line $w$–20 is thereby dropped and this action may be utilized to operate a buzzer and signal light (not shown) and to switch a telephone handset, for example (not shown), to the lines $a$. Actuation of the reset key drops all the TEL relay hold coils to return the system to normal after the alternate communication is completed.

Depression of the TEL key while the reader-sender is in-record actuates TEL–1 and TEL–1A relays 71 and 99, both relays being held through the reset key and the contact 71–1, but the TEL code is not transmitted until the system goes out-of-record. This occurs on receipt of a check code or the second noncheck code during error deletion after the tape has been backed up in the punch, causing TEL–2 relay 72 to be picked through the contact 71–3 and the line $x$–2 from the repeat unit. As shown in FIGURE 2, operation of the TEL–2 relay 72 conditions the appropriate thyratron grids for transmission of the TEL code through the lines $p$–2, $p$–3, $p$–4 and $p$–5, the 13–4 contact being closed by actuation of the relay 13 through the contacts 72–9, 82–3, 68–7 and the conductor $w$–8. Transmission of the code starts when the pick coil of the relay 2 is connected to negative through the contacts 16–1, 13–5, and 72–6 in FIGURE 4, the interlock and non-repeat relays 67 and 68 being actuated through the contact 72–5 and the circuit previously described to prevent more than one transmission. Operation of TEL–4 relay 82 takes place when the contact 72–12 closes and transfer of the 82–3 contact prevents further key trigger operation until the reset key is opened. If the system is in the standby state, the TEL signal may be transmitted immediately, the TEL–2 relay 72 being picked through the contacts 99–1, 61–2 or 66–3, and 67–3.

*Recover control J*

Referring now to FIGURE 8, which shows the details of the recover control unit J comprising the present invention, relays 401, 402, and 403 form a unit record counter which counts the number of records in a block which have been correctly transmitted and reproduced. As shown in the sequence diagram of FIGURES 13 to 16, auto start relay 9 is energized each time a new record is to be transmitted by the reader, and this relay remains energized until the FIGS code at the beginning of the record is detected. Furthermore, if a record is the first in a block, this FIGS code is positioned with respect to the tape notch so that both are detected during the same revolution of shaft 303. At this time, the unit record counter must be reset to 0, and thereafter a count is added to it each time that a record within the block is correctly duplicated at the punch.

As noted before, the receipt of an out-of-record CR code from the punch energizes relay 9 and so initiates a rotation of shaft 303. When normally open contact 9–1 is closed, voltage is applied both to the hold winding of relay 9 and to the pick winding of relay 9A. Relay 9A is therefore energized so as to close contact 9A–1, through which is applied voltage at CB–4 time to the hold winding. When the FIGS code at the beginning of the first record to be read is detected, relays 5, 6 and 13 are energized as above described so as to place the reader-sender in transmit condition. Although the opening of contact 6–3 will de-energize the pick coil of relay 9A, its hold coil will continue to have a voltage applied until the end of CB–4 time. Normally open contact 6–9 now closed, picks FIGS–1 relay 39 during CB–5 time. Furthermore, it is assumed for purposes of the present description that the record first to be transmitted is the first one in a block. Therefore, contacts 30 and 31 in FIGURE 2 also detect a notch in the tape at the same time that the FIGS code is sensed. These contacts 30 and 32 join conductors $q$–2 and $q$–3 so that a signal at CB–6 time will energize notch relay 51 in FIGURE 5 through normally open contact 9–7 now closed. In FIG. 8, the picking of notch relay 51 and the subsequent picking of FIGS–1 relay 39 will energize relays 401 and 401A at CB–6 time through normally open contact 9A–2 now closed, normally closed contact 409–2, and normally open contacts 39–2 and 51–5 now closed. The picking of reset relay 401–A opens contact 401A–1 so as to interrupt the hold circuits of relays 402 and 403, if either happens to be picked at this time. Furthermore, URC–0 relay 401 is held through normally open contact 401–1, now closed, and normally closed contact 402–3. Thus, the initiation of the transmission of a record found at the beginning of a block will automatically reset the unit record counter to 0, which is represented by the energization of relay 401. This will enable the counter to remember the number of records within this block which will be correctly duplicated.

Assuming now that the first record in the block was duplicated with no error, a CR "check" code is generated by the punch so as to initiate transmission of the second record in the block by energizing again auto start relay 9 and relay 9A. When the FIGS code at the beginning of the second record is detected, relay 39 is again picked during the time that relay 9A is still energized. However, no notch is associated with the FIGS code of the second and subsequent records in a block, so that Notch relay 51 remain de-energized. At CB–6 time of the cycle in which this FIGS code is detected, unit record add relay 400 is picked through normally open contact 9A–2 now closed, normally closed contact 409–2, normally open contact 39–2 now closed, and normally closed contact 51–5. Relay 400, after being picked at CB–6 time, is held by its normally open contact 400–1 now closed, until the end of CB–4 time. The picking of relay 400 causes a count of one to be added to the unit record counter in the following manner. Since URC–0 relay 401 is energized at the beginning of this second record, relay 402 is energized at CB–7 time through normally open contact 608 now closed, normally open contact 400–3 now closed, and normally open contact 401–2 now closed. The picking of relay 402 opens contact 402–3 in the hold circuit of relay 401, however, relay 401 does not drop immediately but is still held through normally open contact 400–2 now closed, until relay 400 is de-energized at the end of CB–4 time. The reason for the continued holding of relay 401 after relay 402 picks is due to the fact that contact 401–2 must not transfer to its de-energized position until after the signal at CB–7 time disappears. If relay 401 should drop before the signal at CB–7 time is gone, then relay 403 would pick due to the fact that contact 402–2 is now closed. Relay 402 is held through normally closed contact 401–A, normally closed contact 403–2, and normally open contact 402–1 now closed.

In like manner, at the beginning of the first transmission of the third record in the block, relay 400 will again be energized upon detection of the FIGS code so as to cause relay 403 to be picked through normally open contact 6–8 now closed, normally open contact 400–3 now closed, normally closed contact 401–2, and normally open contact 402–2 now closed. Relay 403 is held through its normally open contact 403–1 now closed, and normally closed contact 401A–1. Also, relay 402 drops immediately upon the opening of contact 403–2, since the opening of the contact 402–2 does not apply the CB–7 signal to any other relay within the counter.

The picking of relay 403 indicates that two records have been duplicated correctly. In other words, a count is not added to the unit record counter until the beginning of transmission of the next succeeding record, which indicates that the record immediately preceding this record has been transmitted correctly. Since the embodiment of the invention in the present application is limited to a paper tape having blocks of three records, no further relays within the unit record counter are required, since when the third record in the block is correctly transmitted, the initiation of transmission of the first record in the next succeeding block will reset the unit record counter as above described. Therefore, when beginning to transmit the first record in the next succeeding block, relay 401–A is momentarily picked so as to de-energize relay 403, during which time URC–0 relay 401 is also picked and thereafter held, as previously described.

Figure 17:
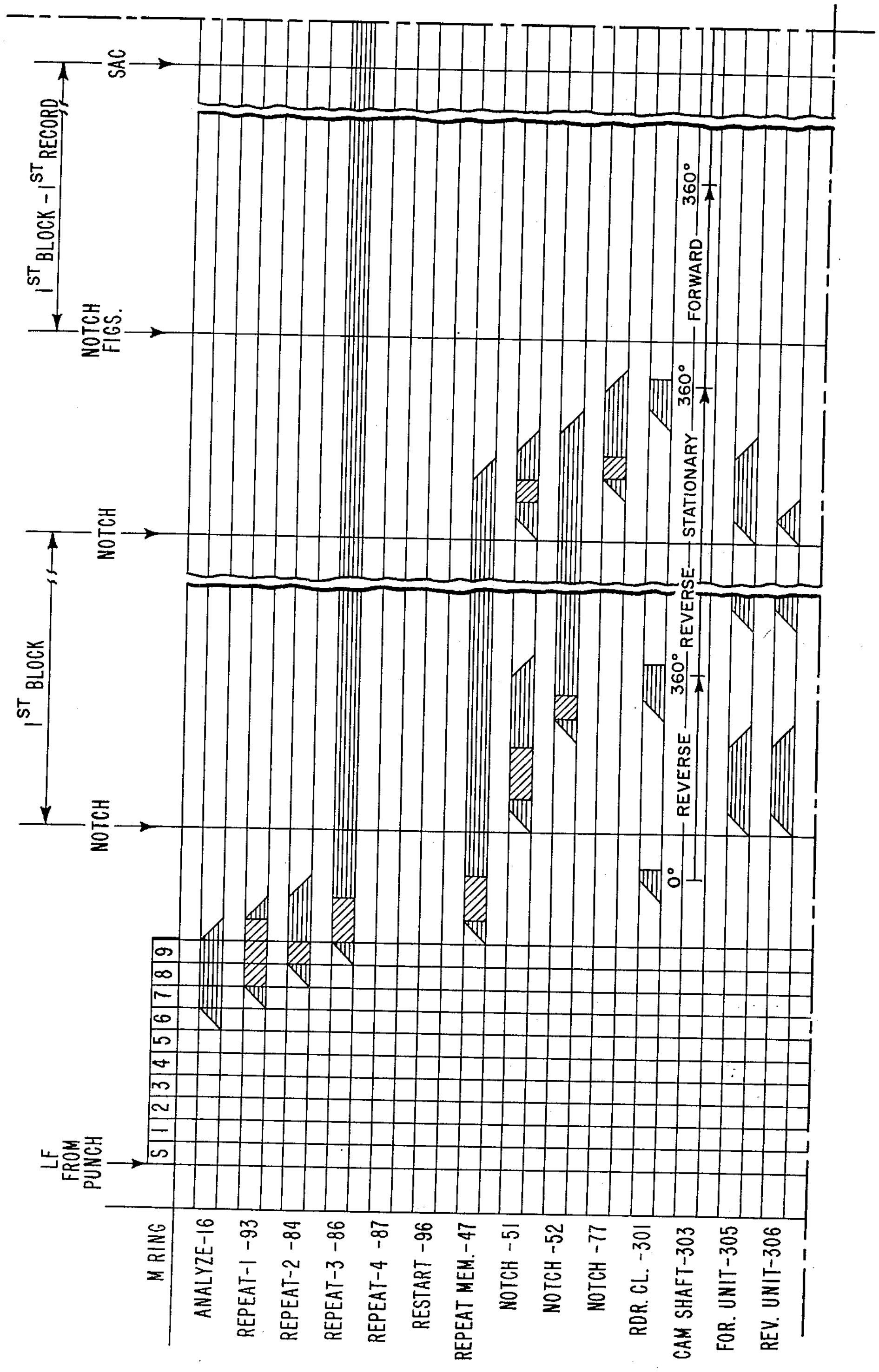
Figure 18:
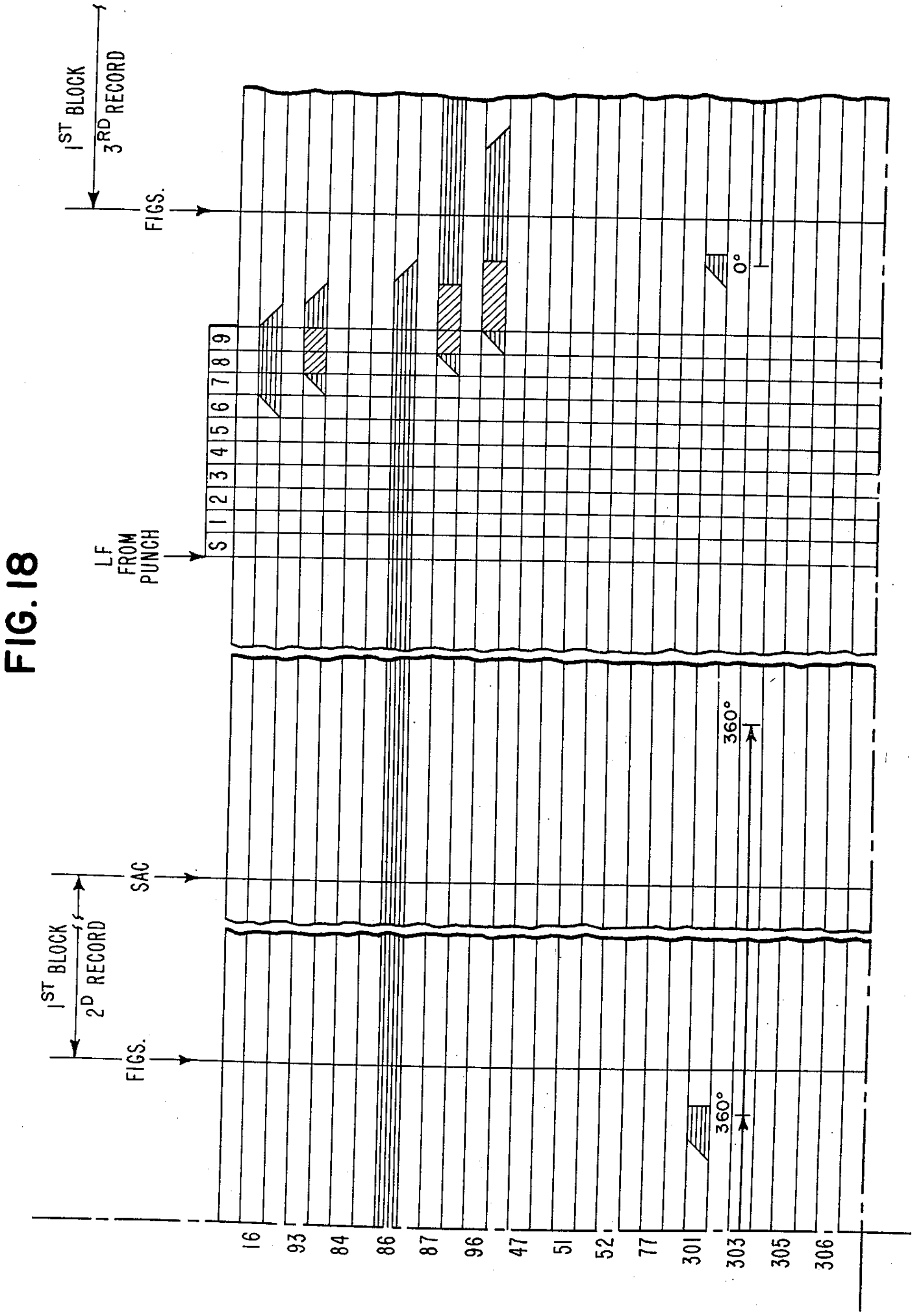
Figure 19:
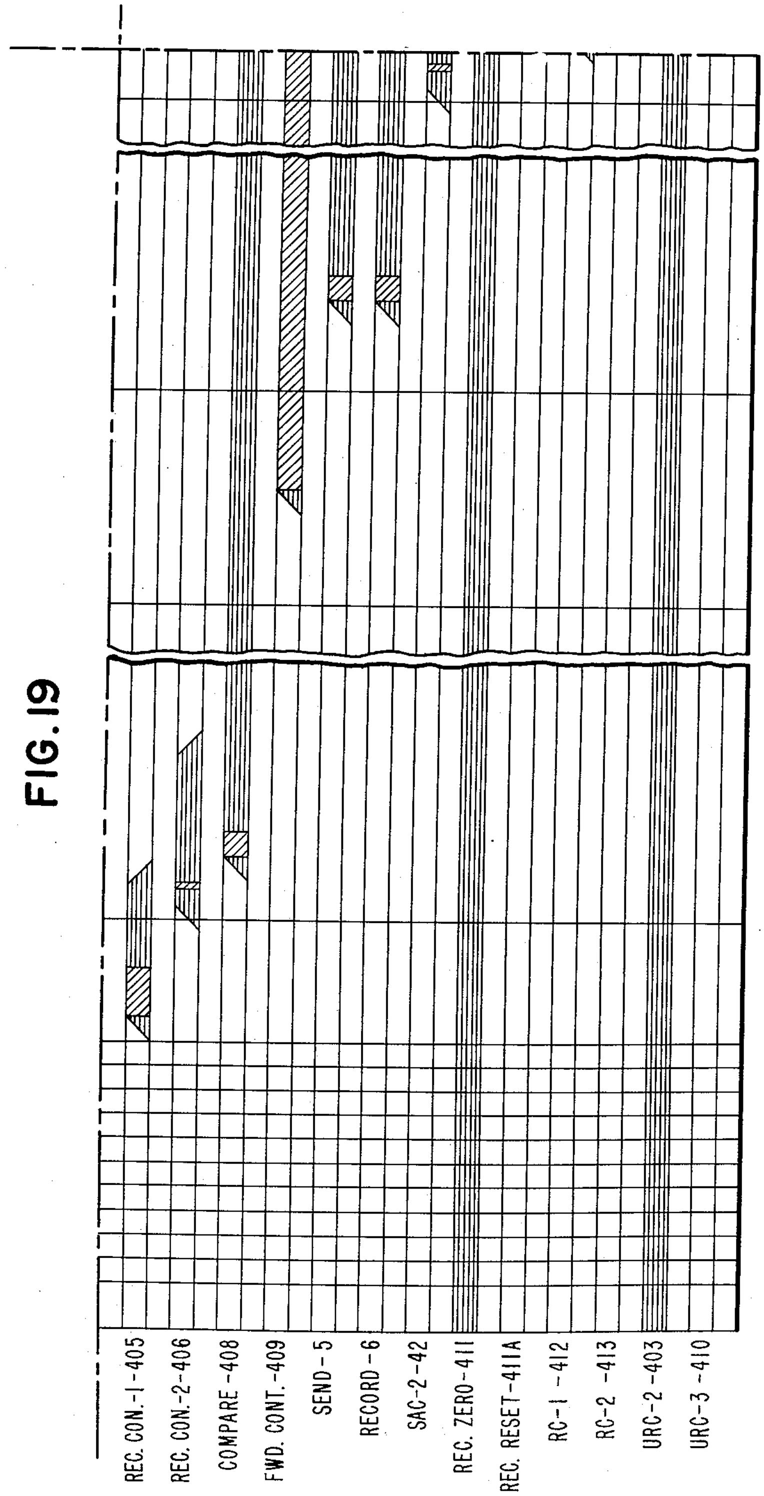
Figure 20:
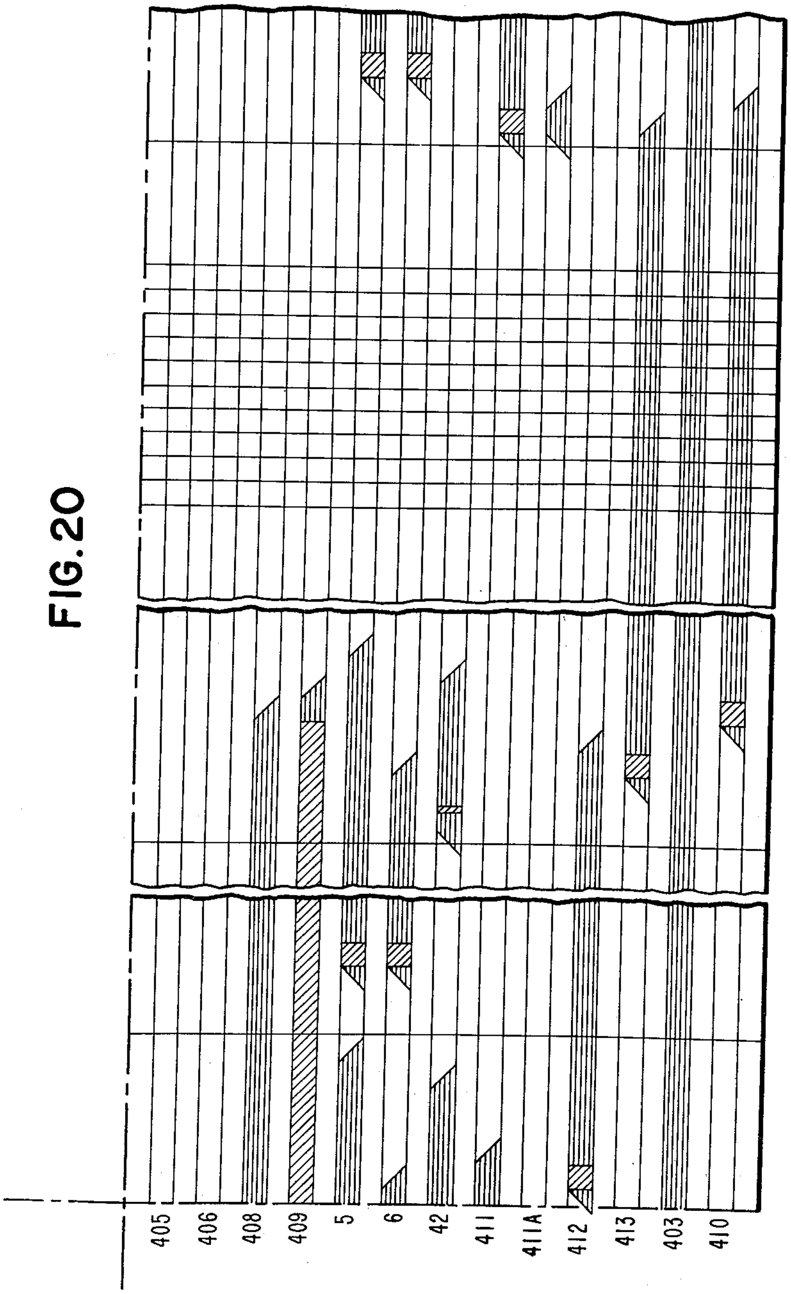

The repeat transmission of an incorrectly duplicated message record will now be described, with particular reference to the sequence diagram shown in FIGURES 17 and 18. Upon determination by the punch-receiver that a record has been incorrectly duplicated, it will transmit an out-of-record LF code to the reader-sender unit which is utilized as the "not check" signal. Since the reader-sender is in its receive condition at this time, the LF code will initiate electronic ring operation so as to activate the single code relay 22 shown in FIGURE 2 in the manner similar to receipt of a CR code. Upon the picking of analyze relay 16 at No. 6 ring time, a circuit will be completed from the 48 volt terminal in FIGURE 4 through normally open contact 16–2 now closed, conductors $g$–5 and $g$–6, normally closed contacts 409–3 and 2–2, conductor 8–1, and normally closed contact 47–7 to energize the repeat–1 relay 93 in FIGURE 6. Relay 93 is held through normally open contact 93–1 now closed, normally closed contacts 47–6 and 62–6, conductor 8–2, normally closed contact 96–3, and the 48 volt terminal in FIGURE 4. The repeat–2 relay 84 is thereafter immediately energized from the 48 volt terminal in FIGURE 6 through normally open contact 93–2 now closed, and normally closed contacts 86–2, 87–2, 89–2, 90–2 and 92–2. Upon contact 84–3 transferring, relay 86 is picked through 93–2 and 84–3. With both relays 84 and 86 energized, a signal is applied to conductor $m$ from the 48 volt terminal through normally open, now closed contacts 86–5 and 84–4. Although contact 86–4 opens, relay 84 continues to be held through 84–1, 93–3, and 9–5 until relay 93 is dropped.

In FIGURE 5, a signal on conductor $m$ will energize repeat memory relay 47 which in turn will be held through normally open contact 47–1 now closed, and normally closed contact 77–2. The energization of relay 47 will de-energize repeat–1 relay 93 in FIGURE 6 by opening its hold and pick circuits, even if relay 16 has not yet been dropped. Furthermore, the picking of relays 47 and the subsequent dropping of relay 93 will cause a voltage to be applied to conductor $y$ in FIGURE 4 from the 48 volt terminal through normally open contact 12–3 now closed, normally closed contacts 6–3 and 93–9, normally open contact 47–5 now closed, and normally closed contact 58–8. This signal appearing on conductor $y$ will initiate a single revolution of shaft 303 by actuating reader-clutch 301. However, as will be subsequently explained, the tape will step in the reverse direction and not in the forward direction. Furthermore, it can be seen that as long as relay 47 is energized, voltage will be applied to conductor $y$ so that shaft 303 will continuously rotate. Upon the dropping of relay 93, relay 84 will drop since contacts 86–4 and 93–3 are now both open.

It is assumed for purposes of the present description that the record to be retransmitted is the last to be found in a particular block. At the time that the first out-of-record LF "not check" code is received from the punch, the tape character beneath sense pins 28 is the FIGS code of the next following record, which is the first record of the next following block. Therefore, a notch is also beneath sense pin 30 which indicates the beginning of this next following block. Upon initiation of the first revolution of cam shaft 303 following the above described energization of relay 47, pin 30 detects this notch so as to connect together conductors $q$–2 and $q$–3. At CB–6 time voltage is applied on conductor $n$–6 which energizes Notch relay 51 in FIGURE 5 through these two now connected conductors, and normally open contact 47–2 now closed. Also at CB–6 time the conductors $q$–5 and $q$–4 are energized through normally open contact 47–4 now closed, and normally open contact 47–3 now closed together with normally closed contact 52–3, respectively. As mentioned before, voltage on both conductors $q$–5 and $q$–4 will render forward unit 305 ineffective and reverse unit 306 effective in FIGURE 9 to step the tape in the reverse direction.

Relay 51 is held by CB–4 through normally closed contact 77–1, and normally open contact 51–1 now closed. At CB–7 time of this revolution, relay 52 is picked through normally open contact 51–3 now closed, and is thereafter held from the 48 volt terminal through normally open contact 47–1 now closed, and normally open contact 52–1, now closed, for the duration of the reverse tape motion until the tape reaches the beginning of the block in which the incorrectly transmitted record is located. However, relay 51 is dropped at the conclusion of CB–4 time of this first cycle.

It can therefore be seen that in succeeding reverse cycles, voltage at CB–6 time is applied to conductor $q$–4 through normally closed contact 51–4, instead of through contact 52–3.

After the tape has stepped backward through the complete block in which the incorrect record is found, the notch at the beginning of this block is detected by pin 30 during the first portion of a shaft revolution. Relay 51 is energized at CB–6 time of this revolution. At CB–5 time, relay 77 is picked through normally open contacts 51–2 and 52–2, now closed. Thereupon, relays 47 and 51 are dropped by the opening of contacts 77–2 and 77–1, respectively, while relay 52 is dropped by the opening of contact 47–1. Furthermore, since both relays 41 and 52 are energized for the greater part of CB–6 time, voltage is applied to conductor $q$–4 for a period insufficient to energize the reverse unit. This results in no motion of the tape during the rotation of cam shaft 303 in which the notch was detected since the forward unit 305 is deenergized due to the presence of a signal on $q$–5 for the full CB–6 time.

Upon detection of the notch at the beginning of the block in question, forward motion of the tape subsequently commences so as to bring the beginning of the incorrect record beneath the sense pins 28 before any retransmission to the punch occurs. Referring now to FIGURE 8, it is noted that the signal appearing on conductor $m$, which initiates picks relay 47 and thus indicates the backward motion of the tape, also energizes REC. CON.–1 relay 405 in recover unit J. Relay 405 is held through its normally open contact 405–1 now closed, until the end of time CB–2. At time CB–3 of this first revolution, REC. CON.–2 relay 406 is picked through normally open contact 405–2 now closed, and it will be held until the end of time CB–4 of the same revolution through its normally open contact 406–1 now closed.

The Simulate Notch (SN) relay 407 is provided in order to energize Notch relay 51 at the beginning of the backward motion of tape 27 in case there is actually no notch present beneath pin 30 at this time. Such a situation exists when the incorrect record is not the last in a block. Relay 407 is energized at CB–5 time during the first revolution of shaft 303 through normally open contact 406–2 now closed, and normally closed contact 51–6. It should be noted that if relay 51 has been picked at CB–6 time due to the detection of an actual notch at this point, as in the case presently being described, then contact 51–6 will be in its transferred or open position so as to prevent the picking of relay 407. If relay 407 is picked, however, it is held until the end of CB–4 time of this first revolution through normally open contact 407–1 now closed. Relay 51 will therefore be picked at CB–7 time of this first cycle by a voltage appearing on conductor $z$ through normally open contact 407–2 now closed. If relay 51 is energized at CB–7 time due to the signal on conductor $z$, then relay 52 is also picked during CB–7 time as previously described. Then, when relay 51 detects the notch at the beginning of the block, as has been previously described, the reverse motion of the tape will cease and relay 77 will pick. Since relay 52 must be energized in order for this to happen it is therefore necessary that the SN relay 407 be provided in order to pick relay 51 even though no notch is to be found in tape 27 at the commencement of reverse motion.

Compare relay 408 in FIGURE 8 may be picked through two alternative circuits. If relay 51 has been picked by detection of an actual notch, then relay 408 is picked at CB–5 time through normally open contact 406–2 now closed, and normally open contact 51–6, now closed. However, if relay 407 is picked, then relay 408 is picked at CB–7 time through 407–2. Relay 408 may be held from the 48 volt terminal through normally closed contact 410–3 and normally open contact 408–1 now closed, only if URC–0 relay 401 in the unit record counter is de-energized so that contact 401–3 is also closed, which is the instant case. If, however, relay 401 is energized at this time, this indicates that the incorrect record is the first in a block. The hold circuit relay 408 then cannot function, and this relay will drop as soon as voltage disappears from its pick coil at the end of the shaft revolution during which the tape made its first step backward.

Upon the tape finally reaching the beginning of the block where detection of the notch causes relay 47 to be de-energized, the forward control relay 409 may be energized at this time through normally closed contact 47–8, and normally open now closed contact 408–2. This of course, assumes that relay 408 had remained energized all during the reverse motion of the tape due to the fact that the incorrect record is not the first in the block. Relay 409 is held through normally closed contacts 410–3 and 401–3, and normally open contact 409–1 now closed. At this time then, the tape has reached the beginning of the block and it must now be moved in a forward direction until it reaches the beginning of the incorrect record whose retransmission to the punch is desired.

In FIGURE 4, the energization of relay 409 causes voltage to be applied to conductor $y$ from the 48 volt terminal through normally open contact 12–3 now closed, normally open contact 409–8 now closed, and normally closed contacts 410–2 and 58–8. This signal thereupon actuates reader-clutch 301 so as to initiate a revolution of shaft 303. However, since relay 47 in FIGURE 5 is now de-energized, no voltage will be applied to conductors $q$–5 or $q$–4 so that forward motion of the tape will now occur during each revolution of the shaft. Thus, as long as relay 409 is energized, revolutions of shaft 303 will continuously be initiated and tape 27 will be stepped one character position during each such revolution in a forward direction.

With the dropping of relay 47, a character sampling voltage at CB–6 time can again be applied to sense pins 28 through normally closed contact 47–2 and conductor $p$–1 so that each character on the tape may energize the code relays in a manner similar to that during the normal forward operations of the tape. When the FIGS code at the beginning of the first record in the block is detected, conductors $p$–5 and $p$–3 will be connected together and sampled at CB–5 time as above described. Send relay 5 and Record relay 6 will thereupon be energized through normally closed contact 2–5. However, transmitting relay 2 cannot be energized this time by the picking of relay 5, since normally closed contact 409–9 is now open. In like manner, key trigger relay 13 cannot be energized by the sensing of this FIGS code since contact 409–6 in FIGURE 7 is now open. However, since it is still desired to detect the end of record code group, it is necessary, in the absence of energization of relay 2, to provide means to energize the CR, FIGS, LF and SAC relays in FIGURE 5. Thus, when a CR code is detected which provides a voltage on lines $g$–5 and $g$–2 this voltage is applied to conductor $h$–5 by means of normally open contact 409–4 now closed. A signal appearing on conductor $h$–5 energizes CR–1 relay 35 in FIGURE 5, which thereafter causes the picking of relays 36, 37 and 38 as above described. In like manner, detection of the FIGS code at the end of a record will energize the FIGS–1 relay 39 through connector $h$–4 and normally open contact 6–9 now closed, from conductor $g$–3. Similarly, detection of the LF code at the end of the record will energize LF relay 43 from conductor $h$–3 by virtue of normally open contact 409–3, now closed. Therefore, it may be seen that the SAC–1 and SAC–2 relays 41 and 42, respectively, are also energized in this order as has been previously described in connection with the normal transmission of a record. It is, however, emphasized that, although the code relays are detecting each and every character in the tape as it is being moved forward by closed contact 409–8, these characters are not being transmitted to the punch-receiver since transmit relay 2 is not energized at this time.

During the forward motion of the tape under control of relay 409, the detection of an "end of a record" group will add one to a recover counter comprised of relays 411, 412, and 413 in FIGURE 8. The construction of the recover counter is quite similar to that of the unit record counter previously described. The recover counter is initially reset to 0 by energizing relay 411 at the same time that relay 401 in the unit record counter is energized. That is, the energization of auto start relay 9, FIGS–1, relay 59, and Notch relay 51 completes a circuit through the pick coil of relay 411 and also through the pick coil of reset relay 411–A. 411–A is momentarily energized so as to de-energize relays 412 and 413 of the recover counter if either happens to be picked at this time. However, relay 411 is held through normally open contact 411–1 now closed, and normally closed contact 412–3 until a value of one is to be added to the recover counter. This addition to the recover counter, however, does not take place until the tape has begun its forward motion under control of relay 409 in order to search for the beginning of an incorrect record. The detection of each end of record code group CR–FIGS–LF will activate the SAC–2 relay 42 as above described so as to close contact 42–2. Since relays 411 and 409 are energized at this time, the pick coil of relay 412 will be energized at CB–5 time through normally open, now closed contacts 409–11, 42–4, and 411–2. This relay will be held through normally open contact 412–1 now closed, and normally closed contact 413–2. Upon the opening of normally closed contact 412–3 in the hold circuit of relay 411, however, relay 411 does not immediately drop since it continues to be held through normally open contact 42–6 now closed, until the signal at CB–5 time disappears. This is required, since if relay 412 drops while the signal at CB–5 time is still present, then relay 413 would be picked because of the closing of contact 412–2. This would result in a count of two being added to the recover counter upon the detection of the end of each record.

In like fashion, upon detection of the end of the record code group of the second record within the block, SAC–2 relay contact 42–2 is again closed and relay 413 is picked through normally open contact 412–2 now closed, and is held through its normally open contact 413–1 now closed. However, relay 412 drops immediately upon the energization of relay 413 since there are no further relays in the recover counter which could be erroneously picked.

Upon detection of the end of the second record in the block, the tape is now at a position where the beginning of the third and last record in the block is beneath sense pins 28 of the tape reader. Since this is the record which was incorrectly duplicated, it is now desired to retransmit this record to the punch. However, the punch must first signify to the reader-sender that it is ready to receive the first retransmission of the incorrect record, since the punch itself has been going through the process of erasing this incorrect record from the receiving tape. The procedure therefore is for the punch to initially send an out-of-record LF code, which is the "not check" signal, to the reader-sender upon its determination that a record is incorrect, and then transmit subsequent LF codes to the reader when it is ready to receive the retransmission of the record. Thus, upon the reader-sender arriving at the beginning of the incorrect record, it stops the tape motion and awaits receipt of a subsequent LF signal from the punch. It is therefore imperative that forward control relay 409 be de-energized so as to prevent further rotation of shaft 303. This is accomplished by providing a compare circuit which indicates equality of count in both the unit record counter and the recover counter so as to de-energize appropriate relays in recover unit J. The Equal relay 410 is therefore energized upon the detection that any of the following pairs of relays 401 and 411, 402 and 412, or 403 and 413, are energized in their respective counters during the time that the tape is under control of relay 409. Thus, the closed condition of contacts 401–4 and 411–3 will energize the pick coil of relay 410 through normally open contact 409–10 now closed, and normally open contact 42–3 now closed. In like manner, the closed condition of contacts 402–4 and 412–4 will energize relay 410, as well as the closed condition of contacts 403–3 and 413–3. It should be particularly noticed that the energizing of relay 410 occurs at CB–7 time, which comes after a count has been added to the recover counter at CB–5 time. Thus, under the present assumptions, when relay 413 in the recover counter is picked at CB–5 time, which occurs at 147 degrees of shaft rotation during which SAC–2 relay 42 is picked, relay 410 will be picked at CB–7 time of the same cycle. The picking of relay 410 de-energizes both Compare relay 408 and forward control relay 409 due to the opening of contact 410–3.

Although relay 409 is eventually dropped by the picking of relay 410, its de-energization may come too late to prevent shaft 303 from beginning a new revolution which would advance the tape past the first character of the record to be retransmitted. As before noted, a new revolution must not be initiated at this point until a "not check" LF signal is received from the punch. Therefore, in FIGURE 4, power is removed from conductor *y* by the opening of contact 410–2 which remains open until relay 409 has dropped and opened contact 409–8.

As is seen in FIGURE 8, Equal relay 410 remains energized by its hold coil as long as circuit breaker CB–2 is closed. Since rotation of shaft 303 ceases after the cycle in which relay 410 was energized, this relay will remain picked until the time when the LF code from the punch initiates retransmission of the record by causing shaft 303 to move. However, during this subsequent cycle, a signal will be applied at CB–3 time through normally open contact 410–4 now closed, to relays 411 and 411A. This results in the recover counter being reset to 0 in order to be prepared for further retransmissions which may be required for this record.

During the time that tape 27 is moving forward under control of relay 409, it is possible that the punch will complete its deletion of the incorrect record before the reader-sender finds the beginning of this record. As soon as the punch is ready to receive again, it will transmit a series of LF codes to the sender until the reader begins to retransmit. Since transmit relay 2 is de-energized at this time, the receipt of each one of these LF codes would activate the electronic ring M and thus energize the appropriate thyratrons in bank N. Since the plates of the code thyratrons in bank N are connected to conductors *e*–1 through *e*–5 when the reader is in its receive condition, it is possible that the code relays in unit B would be energized by these thyratrons during the same time that these code relays are reading the characters from tape 27 which is moving forward under control of relay 409. This is undesirable, since the code relays must detect the end of record code groups. Therefore, energization of relay 409 disconnects conductors *e*–1 through *e*–5 from conductors *f* by means of contacts 409–13 through 409–17 which are normally closed. Furthermore, the firing of electronic ring M by receipt of an LF code from the punch would eventually cause the picking of analyze relay 16 and reset relay 18. This is also undesirable when relay 409 is energized, since the electronic ring operation is not at this time synchronized with the rotation of shaft 303, and the analyzing of the codes detected by pins 28 might come at inopportune times. It is also possible that reset relay 18 would drop relays 20–26 before they have actually been analyzed by the CB–5 signal. For these reasons, then, normally closed contacts 409–12 and 409–18 are opened so as to prevent picking of relays 16 and 18. Furthermore, the activation of SBY–3 relay 58 in the standby unit of FIGURE 7, together with its attendant functions, is undesirable during the time that the tape is under control of relay 409. Therefore, if any out-of-record LTS code is detected by sense pins 28 during the time that the tape is moving forward under control of relay 409, the open condition of normally closed contact 409–7 in FIGURE 4 will prevent standby relay 58 from being picked. In like fashion, the detection of a TEL code will not activate certain relays in the standby unit due to the fact that normally closed contact 409–5 is also opened.

*Repeat H*

As mentioned previously and as explained in the above identified application, the reader-sender is adapted to retransmit the same record automatically a predetermined number of times in response to the determination by the punch that a successful transmission and recordation has never occurred. The circuit illustrated in FIGURE 6 is arranged to provide two successive repeat transmissions, making a total of three transmissions altogether, and then place the system in standby condition if no check code is ever received from the punch. As has already been described, when the particular record is first incorrectly transmitted, the first "not check" code received by the reader from the punch will activate relays 93, 84, and 86 in that sequence so as to provide a signal on conductor *m* which initiates the backward motion of the tape so as to reach the beginning of the block in which the message is found. Then, as has also been described, the tape may immediately move forward until it reaches the beginning of the record to be retransmitted, whereupon relay 409 is de-energized and tape motion ceases to await a "not check" code from the punch. At this time then, only Repeat–3 relay 86 is held in FIGURE 6.

When the punch unit has deleted the incorrect record from the receiving tape and has advanced this tape to a new unused position it will begin to transmit a series of "not check" signals to the reader. As has been described, the reader may be in the process of locating the record to be retransmitted and so will ignore any "not check" signal sent during this time. However, once the reader has found the beginning of this record, relay 409 is dropped and the next "not check" signal transmitted from the punch will pick relay 16 and then relay 93 in the manner described above in connection with the receipt of the first "not check" code. Transfer of the 93–2 contact picks the repeat–4 relay 87 through normally closed contact 84–3, and normally open contact 86–3 now closed, the relay 87 hold coil being energized through contacts 87–1 and 89–4. Relay 86 does not drop now, however, since it is still held through normally open contact 93–4 now closed even though contact 87–4 opens. This completes a circuit through normally open contacts 86–5 and 87–5 now closed, and conductors *x–2* and *w–2* which are connected in the standby unit shown in FIGURE 7, to actuate restart relay 96 in FIGURE 4. The picking of relay 96 interrupts the hold circuit of relay 93 so that this latter relay drops by the time that relay 16 is reset, which thus drops relay 86. Upon the de-energization of relay 93, a signal is now applied to conductor *y* from the 48 volt terminal through normally open contact 12–3 now closed, normally closed contact 6–3, normally closed contact 93–9, normally open contact 96–2 now closed, and normally closed contact 58–8. This initiates a revolution of cam shaft 303 which first causes pins 28 to sense the character below them, and then steps the tape one character in the forward direction. The character below sense pins 28 during the first revolution of the shaft is the FIGS character which begins the third record in the block. The detection of this FIGS code will actuate relays 5, 6, 13, and 2 as in a normal transmitting operation, so that the reader-sender begins to transmit the third record to the punch. Furthermore, upon the picking of relay 6, the hold circuit of restart relay 96 is broken by the opening of contact 6–3. Thereafter, the actuation of reader-clutch 301 is accomplished by the functioning of relay 2 and relay 19 as has been previously described.

If the message is now successfully duplicated during this first retransmission, a check code CR transmitted by the punch will actuate auto start relay 9 through normally open contact 16–2 now closed, conductors *g–5* and *g–2*, normally closed contact 2–3, and conductors *w–18* and *w–11*. This allows the tape to again move forward and transmit the next succeeding record which, under the present assumptions, is in the following block. Also, the opening of contact 9–5 drops all of the relays in the repeat unit H. If, however, the record is not successfully duplicated by the punch during this first retransmission (or second transmission), then the punch will generate further "not check" codes to initiate a second retransmission cycle. In the repeat unit, relay 89 would therefore be actuated through normally open contact 87–3 now closed, normally closed contacts 86–4 and 84–3, and normally open contact 93–2 now closed. The closed condition of contacts 87–6 and 89–5 in FIGURE 3 will provide a signal on conductor *m* which energizes relay 47 and so initiates a backward motion of the tape to again find the beginning of the block, after which the tape under control of relay 409 moves forward until it reaches the beginning of the message to be retransmitted for the second time. It will be noted that the unit record counter still maintains its count until a new block is reached. The relay 89 hold coil remains energized through contacts 89–1 and 90–4 after relay 93 is restored, which returns relay 87 to its de-energized position by the opening of contact 93–5.

Another "not check" signal from the punch after the tape stops at the beginning of the record to be retransmitted for the second time will again actuate relay 93 and also repeat–6 relay 90, whereupon relay 96 will again be energized to initiate the retransmission of this record. If the second retransmission (making the third transmission altogether) of this record fails to result in a correctly duplicated record at the punch, another "not check" signal will cause the tape to again find the beginning of the incorrect record. At this time, repeat–7 relay 92 is the only relay energized in FIGURE 3. After the tape has arrived at the beginning of the record for the third time, the next "not check" signal from the punch transfers contact 93–2 to complete a circuit through normally closed contacts 84–3, 86–3, 87–3, 89–3, 90–3, normally open contact 92–3 now closed, and conductor *x–1* to pick SBY–5 relay 62 in FIGURE 7. This opens contacts 62–5 and 62–6 in FIGURE 6, preventing the further transmission of the record. Thus, the tape in the reader remains stopped at the beginning of the incorrect message. The operator, after examining the tape and the reader, may initiate another series of retransmissions of the incorrect message by depressing the start key, thereby energizing start relay 10 through contact 6–6, 12–1 and 76–1, and dropping relay 62 which is held through contacts 72–11, 10–4, line *w–1*, and contact 62–1.

Although the invention has been described with reference to a preferred embodiment, it will be understood that many modifications and changes therein will occur to those skilled in the art without departing from the spirit of the invention. Accordingly, the scope of the invention is not intended to be limited except as defined by the following claims.

What is claimed is:

1. A reader-transmitter which utilizes a medium for storing a block of information records, and which includes first means for reading said information records from said medium one at a time and second means for transmitting each said record as it is read so as to define a first mode of operation for said reader-transmitter, and third means operative after one of said records has been transmitted for causing said first means to read said records from the beginning of said block while preventing said second means from transmitting so as to define a second mode of operation for said reader-transmitter.

2. A reader-transmitter according to claim 1 in which said third means terminates operation in said second mode when said first means reaches the beginning of said one record.

3. A reader-transmitter according to claim 1 in which said third means includes means being operative during said first mode of operation for counting the number of records transmitted from the beginning of said block up to said one record, and being operative during said second mode of operation for counting the number of records read from the beginning of said block.

4. A reader-transmitter according to claim 3 which further includes fourth means associated with said counting means for terminating said second mode of operation.

5. A reader-transmitter according to claim 4 in which said fourth means terminates said second mode of operation when the number of records counted during the second mode of operation is equal to the number of records counted during the first mode of operation.

6. A reader-transmitter according to claim 1 in which said third means includes a first counter being operative during said first mode of operation for counting the number of records transmitted from the beginning of said block up to said one record, and a second counter being operative during said second mode of operation for counting the number of records read from the beginning of said block.

7. A reader-transmitter according to claim 6 in which means are provided to reset said first counter to a particular value upon said first means beginning to read said block of records for the first time.

8. A reader-transmitter according to claim 6 in which said third means further includes comparing means associated with said first and second counters for terminating said second mode of operation.

9. A reader-transmitter according to claim 8 in which said comparing means terminates said second mode of operation when the content of said second counter is equal to the content of said first counter.

10. A reader-transmitter according to claim 8 in which said second counter is reset to a particular value upon termination of said second mode of operation.

11. A reader-transmitter which utilizes a moving medium for storing a block of information records, and which further includes first means for moving the medium in a forward direction and reading said records one at a time, second means for normally transmitting each said record as it is read, third means operative after one of said records has been transmitted for causing said medium to move in the reverse direction until the beginning of said block is reached, and fourth means thereafter operative for causing said first means to operate while preventing the operation of said second means.

12. A reader-transmitter according to claim 11 in which said first means, when under control of said fourth means, ceases operation when it reaches the beginning of said one record.

No references cited.